United States Patent
Szatmary et al.

(10) Patent No.: US 9,218,563 B2
(45) Date of Patent: Dec. 22, 2015

(54) SPIKING NEURON SENSORY PROCESSING APPARATUS AND METHODS FOR SALIENCY DETECTION

(71) Applicant: Brain Corporation, San Diego, CA (US)

(72) Inventors: Botond Szatmary, Hungary, CA (US); Micah Richert, San Diego, CA (US); Eugene Izhikevich, San Diego, CA (US); Jayram Moorkanikara Nageswaran, San Diego, CA (US); Filip Piekniewski, San Diego, CA (US); Sach Sokol, Washington, DC (US); Csaba Petre, San Diego, CA (US)

(73) Assignee: Brain Corporation, San Diego, CA (US)

(*) Notice: Subject to any disclaimer, the term of this patent is extended or adjusted under 35 U.S.C. 154(b) by 235 days.

(21) Appl. No.: 13/660,982

(22) Filed: Oct. 25, 2012

(65) Prior Publication Data
US 2014/0122400 A1 May 1, 2014

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)
(Continued)

(52) U.S. Cl.
CPC .......................................... *G06N 3/02* (2013.01)

(58) Field of Classification Search
None
See application file for complete search history.

(56) References Cited

U.S. PATENT DOCUMENTS 5,063,603 A 11/1991 Burt
5,138,447 A 8/1992 Shen et al.
(Continued)

FOREIGN PATENT DOCUMENTS

CN 102226740 A 10/2011
JP 4087423 3/1992
(Continued)

OTHER PUBLICATIONS

Swiercz, Waldemar, et al. "A new synaptic plasticity rule for networks of spiking neurons." Neural Networks, IEEE Transactions on 17.1 (2006): 94-105.*

(Continued)

*Primary Examiner* — Kakali Chaki
*Assistant Examiner* — Daniel Pellett
(74) *Attorney, Agent, or Firm* — Gazdzinski & Associates, PC

(57) ABSTRACT

Apparatus and methods for salient feature detection by a spiking neuron network. The network may comprise feature-specific units capable of responding to different objects (red and green color). The plasticity mechanism of the network may be configured based on difference between two similarity measures related to activity of different unit types obtained during network training. One similarity measure may be based on activity of units of the same type (red). Another similarity measure may be based on activity of units of one type (red) and another type (green). Similarity measures may comprise a cross-correlogram and/or mutual information determined over an activity window. During network operation, the activity based plasticity mechanism may be used to potentiate connections between units of the same type (red-red). The plasticity mechanism may be used to depress connections between units of different types (red-green). The plasticity mechanism may effectuate detection of salient features in the input.

23 Claims, 16 Drawing Sheets

(51) Int. Cl.
  *G06F 15/00* (2006.01)
  *G06F 17/00* (2006.01)
  *G06N 3/10* (2006.01)

(56) References Cited

U.S. PATENT DOCUMENTS

| | | | |
|---|---|---|---|
| 5,216,752 | A | 6/1993 | Tam |
| 5,272,535 | A | 12/1993 | Elabd |
| 5,355,435 | A | 10/1994 | Deyong et al. |
| 5,638,359 | A | 6/1997 | Peltola et al. |
| 5,652,594 | A | 7/1997 | Costas |
| 5,673,367 | A | 9/1997 | Buckley |
| 5,875,108 | A | 2/1999 | Hoffberg |
| 6,009,418 | A | 12/1999 | Cooper |
| 6,014,653 | A | 1/2000 | Thaler |
| 6,035,389 | A | 3/2000 | Grochowski |
| 6,418,424 | B1 | 7/2002 | Hoffberg et al. |
| 6,458,157 | B1 | 10/2002 | Suaning |
| 6,509,854 | B1 | 1/2003 | Morita |
| 6,545,705 | B1 | 4/2003 | Sigel et al. |
| 6,545,708 | B1 | 4/2003 | Tamayama |
| 6,546,291 | B2 | 4/2003 | Merfield et al. |
| 6,581,046 | B1 | 6/2003 | Ahissar |
| 6,625,317 | B1 | 9/2003 | Gaffin et al. |
| 7,054,850 | B2 * | 5/2006 | Matsugu ................... 706/48 |
| 7,565,203 | B2 | 7/2009 | Greenberg et al. |
| 7,580,907 | B1 | 8/2009 | Rhodes |
| 7,653,255 | B2 | 1/2010 | Rastogi |
| 7,737,933 | B2 | 6/2010 | Yamano et al. |
| 7,765,029 | B2 | 7/2010 | Fleischer et al. |
| 7,849,030 | B2 | 12/2010 | Ellingsworth |
| 8,000,967 | B2 | 8/2011 | Taleb |
| 8,015,130 | B2 | 9/2011 | Matsugu |
| 8,103,602 | B2 | 1/2012 | Izhikevich |
| 8,154,436 | B2 | 4/2012 | Szajnowski |
| 8,160,354 | B2 | 4/2012 | Paquier |
| 8,200,593 | B2 | 6/2012 | Guillen |
| 8,281,997 | B2 | 10/2012 | Moran et al. |
| 8,311,965 | B2 | 11/2012 | Breitwisch |
| 8,315,305 | B2 | 11/2012 | Petre |
| 8,346,692 | B2 | 1/2013 | Rouat et al. |
| 8,390,707 | B2 | 3/2013 | Yamashita |
| 8,416,847 | B2 | 4/2013 | Roman |
| 8,467,623 | B2 | 6/2013 | Izhikevich |
| 8,515,160 | B1 | 8/2013 | Khosla et al. |
| 8,583,286 | B2 | 11/2013 | Fleischer et al. |
| 8,712,939 | B2 | 4/2014 | Szatmary et al. |
| 8,712,941 | B2 | 4/2014 | Izhikevich et al. |
| 8,719,199 | B2 | 5/2014 | Izhikevich et al. |
| 8,725,658 | B2 | 5/2014 | Izhikevich et al. |
| 8,725,662 | B2 | 5/2014 | Izhikevich et al. |
| 8,756,183 | B1 | 6/2014 | Daily et al. |
| 8,775,341 | B1 | 7/2014 | Commons |
| 8,793,205 | B1 | 7/2014 | Fisher et al. |
| 8,943,008 | B2 | 1/2015 | Ponulak et al. |
| 8,972,315 | B2 | 3/2015 | Szatmary et al. |
| 8,977,582 | B2 | 3/2015 | Richert |
| 8,983,216 | B2 | 3/2015 | Izhikevich et al. |
| 8,990,133 | B1 | 3/2015 | Ponulak et al. |
| 8,996,177 | B2 | 3/2015 | Coenen |
| 2002/0038294 | A1 | 3/2002 | Matsugu |
| 2003/0050903 | A1 * | 3/2003 | Liaw et al. ................. 706/22 |
| 2003/0216919 | A1 | 11/2003 | Roushar |
| 2003/0222987 | A1 | 12/2003 | Karazuba |
| 2004/0054964 | A1 | 3/2004 | Bozdagi |
| 2004/0136439 | A1 | 7/2004 | Dewberry |
| 2004/0170330 | A1 | 9/2004 | Fogg |
| 2004/0193670 | A1 | 9/2004 | Langan et al. |
| 2004/0220082 | A1 | 11/2004 | Surmeier et al. |
| 2005/0015351 | A1 | 1/2005 | Nugent |
| 2005/0036649 | A1 | 2/2005 | Yokono et al. |
| 2005/0096539 | A1 | 5/2005 | Leibig |
| 2005/0283450 | A1 | 12/2005 | Matsugu |
| 2006/0094001 | A1 | 5/2006 | Torre |
| 2006/0129728 | A1 | 6/2006 | Hampel |
| 2006/0161218 | A1 | 7/2006 | Danilov |
| 2007/0022068 | A1 | 1/2007 | Linsker |
| 2007/0176643 | A1 | 8/2007 | Nugent |
| 2007/0208678 | A1 | 9/2007 | Matsugu |
| 2008/0100482 | A1 | 5/2008 | Lazar |
| 2008/0174700 | A1 | 7/2008 | Takaba |
| 2008/0199072 | A1 | 8/2008 | Kondo |
| 2008/0201282 | A1 * | 8/2008 | Garcia et al. ................... 706/20 |
| 2008/0237446 | A1 | 10/2008 | Oshikubo |
| 2009/0043722 | A1 | 2/2009 | Nugent |
| 2009/0287624 | A1 | 11/2009 | Rouat |
| 2010/0036457 | A1 | 2/2010 | Sarpeshkar |
| 2010/0081958 | A1 | 4/2010 | She |
| 2010/0086171 | A1 | 4/2010 | Lapstun |
| 2010/0100482 | A1 | 4/2010 | Hardt |
| 2010/0166320 | A1 | 7/2010 | Paquier |
| 2010/0225824 | A1 | 9/2010 | Lazar |
| 2010/0235310 | A1 | 9/2010 | Gage et al. |
| 2010/0299296 | A1 | 11/2010 | Modha et al. |
| 2011/0016071 | A1 | 1/2011 | Guillen |
| 2011/0119214 | A1 | 5/2011 | Breitwisch |
| 2011/0119215 | A1 | 5/2011 | Elmegreen |
| 2011/0134242 | A1 | 6/2011 | Loubser |
| 2011/0137843 | A1 | 6/2011 | Poon et al. |
| 2011/0160741 | A1 | 6/2011 | Asano |
| 2011/0184556 | A1 | 7/2011 | Seth et al. |
| 2011/0206122 | A1 | 8/2011 | Lu |
| 2011/0235698 | A1 | 9/2011 | Petre et al. |
| 2012/0011090 | A1 | 1/2012 | Tang |
| 2012/0083982 | A1 | 4/2012 | Bonefas |
| 2012/0084240 | A1 | 4/2012 | Esser et al. |
| 2012/0109866 | A1 | 5/2012 | Modha |
| 2012/0117012 | A1 | 5/2012 | Szatm ry et al. |
| 2012/0303091 | A1 | 11/2012 | Izhikevich |
| 2012/0308076 | A1 | 12/2012 | Piekniewski |
| 2012/0308136 | A1 | 12/2012 | Izhikevich |
| 2012/0330872 | A1 | 12/2012 | Esser et al. |
| 2013/0046716 | A1 | 2/2013 | Chan et al. |
| 2013/0073484 | A1 | 3/2013 | Izhikevich |
| 2013/0073491 | A1 | 3/2013 | Izhikevich |
| 2013/0073492 | A1 | 3/2013 | Izhikevich |
| 2013/0073495 | A1 | 3/2013 | Izhikevich |
| 2013/0073496 | A1 | 3/2013 | Szatmary |
| 2013/0073498 | A1 | 3/2013 | Izhikevich |
| 2013/0073499 | A1 | 3/2013 | Izhikevich |
| 2013/0073500 | A1 | 3/2013 | Szatmary |
| 2013/0103626 | A1 | 4/2013 | Hunzinger |
| 2013/0117212 | A1 * | 5/2013 | Hunzinger et al. ............. 706/25 |
| 2013/0151450 | A1 | 6/2013 | Ponulak |
| 2013/0204814 | A1 | 8/2013 | Hunzinger et al. |
| 2013/0218821 | A1 | 8/2013 | Szatmary |
| 2013/0251278 | A1 | 9/2013 | Izhikevich |
| 2013/0297539 | A1 | 11/2013 | Piekniewski et al. |
| 2013/0297541 | A1 | 11/2013 | Piekniewski et al. |
| 2013/0297542 | A1 | 11/2013 | Piekniewski et al. |
| 2013/0325766 | A1 | 12/2013 | Petre et al. |
| 2013/0325768 | A1 | 12/2013 | Sinyavskiy |
| 2013/0325773 | A1 | 12/2013 | Sinyavskiy |
| 2013/0325774 | A1 | 12/2013 | Sinyavskiy |
| 2013/0325775 | A1 | 12/2013 | Sinyavskiy |
| 2013/0325777 | A1 | 12/2013 | Petre et al. |
| 2014/0012788 | A1 | 1/2014 | Piekniewski |
| 2014/0016858 | A1 | 1/2014 | Richert |
| 2014/0032458 | A1 | 1/2014 | Sinyavskiy |
| 2014/0032459 | A1 | 1/2014 | Sinyavskiy |
| 2014/0052679 | A1 | 2/2014 | Sinyavskiy |
| 2014/0064609 | A1 | 3/2014 | Petre et al. |
| 2014/0122397 | A1 | 5/2014 | Richert |
| 2014/0122398 | A1 | 5/2014 | Richert |
| 2014/0122399 | A1 | 5/2014 | Szatmary |
| 2014/0156574 | A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |

(56) References Cited

FOREIGN PATENT DOCUMENTS

| | | |
|---|---|---|
| RU | 2424561 C2 | 7/2011 |
| WO | 2008083335 A2 | 7/2008 |
| WO | 2008132066 A1 | 11/2008 |

OTHER PUBLICATIONS

Li, Zhaoping. "A saliency map in primary visual cortex." Trends in cognitive sciences 6.1 (2002): 9-16.*

It, Laurent, and Christof Koch. "Computational modelling of visual attention."Nature reviews neuroscience 2.3 (2001): 194-203.*

Izhikevich, Eugene M. Dynamical systems in neuroscience; chapters 1 and 2. MIT press, 2007.*

Chistiakova, Marina, and Maxim Volgushev. "Heterosynaptic plasticity in the neocortex." Experimental brain research 199.3-4 (2009): 377-390.*

Meinhardt, Hans, and Alfred Gierer. "Pattern formation by local self-activation and lateral inhibition." Bioessays 22.8 (2000): 753-760.*

Markram, Henry, et al. "Regulation of synaptic efficacy by coincidence of postsynaptic APs and EPSPs." Science 275.5297 (1997): 213-215.*

Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.*

Izhikevich, Eugene M. "Simple model of spiking neurons." IEEE Transactions on neural networks 14.6 (2003): 1569-1572.*

Fiete, Ila R., et al. "Spike-time-dependent plasticity and heterosynaptic competition organize networks to produce long scale-free sequences of neural activity." Neuron 65.4 (2010): 563-576.*

Bush, Daniel. STDP, Rate-coded Hebbian Learning and Auto-associative Network Models of the Hippocampus. Diss. University of Sussex, 2009.*

Glackin, Cornelius, Liam Maguire, and Liam McDaid. "Feature extraction from spectro-temporal signals using dynamic synapses, recurrency, and lateral inhibition." Neural Networks (IJCNN), The 2010 International Joint Conference on. IEEE, 2010.*

Knoblauch, Andreas, Günther Palm, and Friedrich T. Sommer. "Memory capacities for synaptic and structural plasticity." Neural Computation 22.2 (2010): 289-341.*

Leydesdorff, Loet, and Stephen Bensman. "Classification and powerlaws: The logarithmic transformation." Journal of the American Society for Information Science and Technology 57.11 (2006): 1470-1486.*

Medini, Chaitanya, et al. "Modeling cerebellar granular layer excitability and combinatorial computation with spikes." Bio-Inspired Computing: Theories and Applications (BIC-TA), 2010 IEEE Fifth International Conference on. IEEE, 2010.*

Wade, John J., et al. "SWAT: a spiking neural network training algorithm for classification problems." Neural Networks, IEEE Transactions on 21.11 (2010): 1817-1830.*

Wennekers, Thomas. "Analysis of spatio-temporal patterns in associative networks of spiking neurons." Artificial Neural Networks, 1999. ICANN 99. Ninth International Conference on (Conf. Publ. No. 470). vol. 1. IET, 1999.*

Florian, Razvan V. "Biologically inspired neural networks for the control of embodied agents." Center for Cognitive and Neural Studies (Cluj-Napoca, Romania), Technical Report Coneural-03-03 (2003).*

Niv, Yael. Evolution of Reinforcement Learning in Uncertain Environments. Diss. Tel Aviv University, 2001.*

Ostojic, Srdjan, and Nicolas Brunel. "From spiking neuron models to linear-nonlinear models." PLoS Comput. Biol 7.1 (2011): e1001056.*

Ruan, Chengmei, et al. "Competitive behaviors of a spiking neural network with spike timing dependent plasticity." Biomedical Engineering and Informatics (BMEI), 2012 5th International Conference on. IEEE, 2012.*

Thorpe, Simon. "Ultra-rapid scene categorization with a wave of spikes."Biologically motivated computer vision. Springer Berlin Heidelberg, 2002.*

Voutsas, Kyriakos, and Jürgen Adamy. "A biologically inspired spiking neural network for sound source lateralization." Neural Networks, IEEE Transactions on 18.6 (2007): 1785-1799.*

Wysoski, Simei Gomes, Lubica Benuskova, and Nikola Kasabov. "Fast and adaptive network of spiking neurons for multi-view visual pattern recognition." Neurocomputing 71.13 (2008): 2563-2575.*

Berkes and Wiskott, Slow feature analysis yields a rich repertoire of complex cell properties. *Journal of Vision* (2005) vol. 5 (6).

Bohte, 'Spiking Nueral Networks' Doctorate at the University of Leiden, Holland, Mar. 5, 2003, pp. 1-133 [retrieved on Nov. 14, 2012]. Retrieved from the Internet: <URL: http://holnepages, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber-5596678&tag=1.

Field, G.; Chichilnisky, E., Information Processing in the Primate Retina: Circuitry and Coding. *Annual Review of Neuroscience*, 2007, 30(1), 1-30.

Fiete, et al., Spike-Time-Dependent Plasticity and Heterosynaptic Competition Organize Networks to Produce Long Scale-Free Sequences of Neural Activity. *Neuron 65*, Feb. 25, 2010, pp. 563-576.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Földiák, P., Learning invariance from transformation sequences. *Neural Computation*, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gerstner et al. (1996) A neuronal learning rule for sub-millisecond temporal coding. *Nature* vol. 383 (6595) pp. 76-78.

Gewaltig et al., 'NEST (Neural Simulation Tool)', Scholarpedia, 2007, pp. 1-15, 2(4): 1430, doi: 10.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+GENERALIZATION+AND+REPRESENTATIO N+IN+ADAPTIVE+NETWORK+MODELS+OF+CATEGORY+LEARNING%22+1991.

Gollisch et al. 'Rapid neural coding in the retina with relative spike latencies.' Science 319.5866 (2008): 11-08-1111.

Goodman et al., Brian: a simulator for spiking neural networks in Python, Frontiers in Neuroinformatics, Nov. 2008, pp. 1-10, vol. 2, Article 5.

(56) References Cited

OTHER PUBLICATIONS

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*, 18:245-282.

Izhikevich et al., 'Relating STDP to BCM', Neural Computation (2003) 15, 1511-1523.

Izhikevich, E.M. (2007) Dynamical Systems in Neuroscience: The Geometry of Excitability and Bursting, *The MIT Press*, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. *Network, Computation in Neural Systems*, 2006, 17 (1), 31-41.

Karbowski et al., 'Multispikes and Synchronization in a Large Neural Network with Temporal Delays', Neural Computation 12, 1573-1606 (2000).

Khotanzad, Alireza, Classification of invariant image representations using a neural network, IEEF. Transactions on Acoustics, Speech, and Signal Processing vol. 38 No. 6 Jun. 1990 pp. 1028-1038.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Knoblauch, et al. Memory Capacities for Synaptic and Structural Plasticity, *Neural Computation* 2009, pp. 1-45.

Laurent, 'Issue 1—nnql—Refactor Nucleus into its own file—Neural Network Query Language' [retrieved on Nov. 12, 2013]. Retrieved from the Internet: <URL: https://code.google.com/p/nnql/issues/detail?id-1>.

Laurent, 'The Neural Network Query Language (NNQL) Reference' [retrieved on Nov. 12, 2013]. Retrieved from the Internet: <URL'https://code.google.com/p/nnql/issues/detail?id=I>.

Lazar et al. 'A video time encoding machine', in Proceedings of the 15th IEEE International Conference on Image Processing (ICIP '08}, 2008, pp. 717-720.

Lazar et al., 'Consistent recovery of sensory stimuli encoded with MIMO neural circuits.' Computational intelligence and neuroscience (2010): 2.

Lazar et al. 'Multichannel time encoding with integrate-and-fire neurons.' Neurocomputing 65 (2005): 401-407.

Masquelier and Thorpe, Learning to recognize objects using waves of spikes and Spike Timing-Dependent Plasticity. *Neural Networks* (IJCNN), The 2010 International Joint Conference on DOI—10.1109/IJCNN.2010.5596934 (2010) pp. 1-8.

Masquelier, Timothee. 'Relative spike time coding and STOP-based orientation selectivity in the early visual system in natural continuous and saccadic vision: a computational model.' Journal of computational neuroscience 32.3 (2012): 425-441.

Meister, M., Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Nichols, A Re configurable Computing Architecture for Implementing Artificial Neural Networks on FPGA, Master's Thesis, The University of Guelph, 2003, pp. 1-235.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Paugam-Moisy et al. 'Computing with spiking neuron networks.' Handbook of Natural Computing, 40 p. Springer, Heidelberg (2009).

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online][Retrieved on Dec. 10, 2013] Retrieved from the Internet <URL: http://citeseerx.ist.psu.edu/viewdoc/download?doi=10.1.1.5.4346&rep=rep1&type=pdf.

Rekeczky, et al., "Cellular Multiadaptive Analogic Architecture: A Computational Framework for UAV Applications," May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis, Universita di Granada* Mar. 28, 2008, pp. 1-104.

Sato et al., 'Pulse interval and width modulation for video transmission.' Cable Television, IEEE Transactions on 4 (1978): 165-173.

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. *Neuron*, 2003, 37, 499-511.

Serrano-Gotarredona, et al, "On Real-Time: AER 2-D Convolutions Hardware for Neuromorphic Spike-based Cortical Processing", Jul. 2008.

Simulink.rtm. model [online], [Retrieved on Dec. 10, 2013] Retrieved from <URL: http://www.mathworks.com/ products/ simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi% 2F10.1371 %2Fjournal.pcbi.10008 79#>.

Thomas S. and Riesenhuber, M, 2004, Realistic Modeling of Simple and Complex Cell Tuning in the HMAX Model, and Implications for Invariant Object Recognition in Cortex, *Al Memo* 2004-017 Jul. 2004.

Thorpe, S.J., Delorme, A. & Vanrullen, R. (2001). Spike-based strategies for rapid processing. *Neural Networks* 14, pp. 715-725.

Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.

Tim Gollisch and Markus Meister (2008) Rapid Neural Coding in the Retina with Relative Spike Latencies. *Science* 319:1108-1111.

Van Rullen R.; Thorpe, S. Rate Coding versus temporal order coding: What the Retinal ganglion cells tell the visual cortex. *Neural computation*, 2001, 13, 1255-1283.

Vanrullen, R. & Koch, C. (2003). Is perception discrete or continuous? *Trends in Cognitive Sciences* 7(5), pp. 207-213.

Vanrullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wang, 'The time dimension for scene analysis.' Neural Networks, IEEE Transactions on 16.6 (2005): 1401-1426.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

Wiskott, et al., "Slow Feature Analysis", 2002, 29 pages.

(56) References Cited

OTHER PUBLICATIONS

Ramachandran, et al., "The Perception of Phantom Limbs", The D.O. Hebb Lecture, Center for Brain and Cognition, University of California, 1998, 121, 1603-1630, 28 pages.

Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.

Izhikevich E.M., "Neural Excitability, Spiking and Bursting", Neurosciences Institute, Received Jun. 9, 1999, Revised Oct. 25, 1999, 1171-1266, 96 pages.

Kazantsev, et al., "Active Spike Transmission in the Neuron Model With a Winding Threshold Maniford", Jan. 3, 2012, 205-211, 7 pages.

Kling-Petersen, PhD, "Sun and HPC: From Systems to PetaScale" Sun Microsystems, no date, 31 pages.

Martinez-Perez, et al., "Automatic Activity Estimation Based on Object Behavior Signature", 2010, 10 pages.

Matsugu, et al., "Convolutional Spiking Neural Network for Robust Object Detection with Population Code Using Structured Pulse Packets", 2004. 39-55, 17 pages.

ITTI, Laurent, and Christof Koch. "Computational modelling of visual attention." Nature reviews neuroscience 2.3 (2001): pp. 194-203.

Li Zhaoping, "A Saliency map in primary visual cortex." Trends in cognitive sciences 6.1 (2002): 9-16.

Markram, Henry, et al, "Regualtion of synaptic efficacy by coincidence of postsynaptic APs and EPSPs." Scince 275.5297 (1997): 213-215.

Meinhardt, Hans, and Alfred Gierer. "Pattern formation by local self-activation and lateral inhibition." Bioessays 22.8 (2000): 753-760. Foraging Behaviors, International Society for Adaptive Behavior, 2002, vol. 10(1). pp. 5-24.

Stringer, et al., "Invariant Object Recognition in the Visual System with Novel Views of 3D Objects", 2002, 2585-2596, 12 pages.

Swiercz, Waldemar, et al. "A new synpatic plasticity rule for networks for spiking neurons." Neural Networks, IEEE Transactions on 17.1 (2006) 94-105.

Wu, QingXiang et al., Edge Detection Based on Spiking Neural Network Model, ICIC 2007, LNAI 4682, pp. 26-34, 2007, Springer-Verlag, Berlin Heidelberg.

Wu, QingXiang, et al. "Remembering Key Features of Visual Images based on Spike Timing Dependent Plasticity of Spiking Neurons." Image and Signal Processing, 2009. CISP '09. $2^{ND}$ International Congress on. IEEE 2009.

\* cited by examiner

SPIKING NEURON SENSORY PROCESSING APPARATUS AND METHODS FOR SALIENCY DETECTION

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011, and patented as U.S. Pat. No. 8,942,466 Jan. 27, 2015, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, co-owned and co-pending U.S. patent application Ser. No. 13/465,918, entitled "SPIKING NEURAL NETWORK OBJECT RECOGNITION APPARATUS AND METHODS", filed May 7, 2012, co-owned and co-pending U.S. patent application Ser. No. 13/488,106, entitled "SPIKING NEURON NETWORK APPARATUS AND METHODS", filed Jun. 4, 2012, co-owned U.S. patent application Ser. No. 13/488,114, entitled "SPIKING NEURON NETWORK APPARATUS AND METHODS", filed Jun. 4, 2012, co-owned and co-pending U.S. patent application Ser. No. 13/541,531, entitled "CONDITIONAL PLASTICITY SPIKING NEURON NETWORK APPARATUS AND METHODS", filed Jul. 3, 2012, co-owned and co-pending U.S. patent application Ser. No. 13/660,923, entitled "ADAPTIVE PLASTICITY APPARATUS AND METHODS FOR SPIKING NEURON NETWORK", filed herewith on Oct. 25, 2012, co-owned and co-pending U.S. patent application Ser. No. 13/660,945 entitled "MODULATED PLASTICITY APPARATUS AND METHODS FOR SPIKING NEURON NETWORK", filed herewith on Oct. 25, 2012, and co-owned U.S. patent application Ser. No. 13/660,967, entitled "APPARATUS AND METHODS FOR ACTIVITY-BASED PLASTICITY IN A SPIKING NEURON NETWORK", filed herewith on Oct. 25, 2012, and patented as U.S. Pat. No. 8,972,315 on Mar. 3, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to computer vision and machine learning using artificial neural networks, and more particularly in one exemplary aspect to computer apparatus and methods for processing of sensory data using pulse-code neural networks.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

Typically, artificial spiking neural networks, such as the network described in owned U.S. patent application Ser. No. 13/541,531, entitled "CONDITIONAL PLASTICITY SPIKING NEURON NETWORK APPARATUS AND METHODS" and incorporated herein by reference in its entirety, may comprise a plurality of units (or nodes), which correspond to neurons in a biological neural network. Any given unit may be connected to many other units via connections, also referred to as communications channels, and/or synaptic connections. The units providing inputs to any given unit are commonly referred to as the pre-synaptic units, while the unit receiving the inputs is referred to as the post-synaptic unit.

Each of the unit-to-unit connections may be assigned, inter alia, a connection efficacy, which in general may refer to a magnitude and/or probability of input spike influence on unit output response (i.e., output spike generation/firing). The efficacy may comprise, for example a parameter—synaptic weight—by which one or more state variables of post-synaptic unit are changed. During operation of a pulse-code network, synaptic weights may be dynamically adjusted using what is referred to as the spike-timing dependent plasticity (STDP) in order to implement, among other things, network learning. In some implementations, larger weights may be associated with a greater effect a synapse has on the activity of the post-synaptic neuron.

In some prior art visual processing implementations, such as illustrated in FIG. 1, a spiking neuron network in may comprise one or more identical neurons. During operation, the neurons of the network may evolve based on the neuron adaptation process and the input, illustrated by the frame 102 in FIG. 1. The input may comprise one or more objects and/or features 104, 106. Some of the features may be less frequently present in the input (e.g., the horizontal feature 104 in FIG. 1A) compared to other features (e.g., such as vertical features 106 in FIG. 1). In some applications it may be of benefit to quickly identify salient (e.g., less frequent) features in order to, for example, instruct a saccading module of a visual processing system to transition (saccade) to the salient feature. Such salient feature selection may also be referred to as formation of a "pop-out".

As a result of network operation, the neuron population of the network may evolve to comprise two (or more) different types of neurons, as depicted by squares 116 and circles 114 in FIG. 1. The neurons of different types may be randomly distributed and randomly connected via connections 118, as illustrated by the network snapshots shown in the panels 110, 140 in FIG. 1. The neurons 104, 106 of the network may evolve to form receptive fields, e.g., depicted by broken line rectangles in FIG. 1. As the vertical features are more frequent in the input 102, more of the receptive fields may select a vertical feature, as shown by the receptive field map 120 in FIG. 1. In some realizations, the receptive fields may fail to form, and/or may select the wrong objects (e.g., the background shown in the panel 150). The receptive field map 150 of FIG. 1 does not contain a pop-out.

Some existing approaches utilize re-wiring of the network during operation in order to, for example, identify salient features (cause pop-outs). However, such processes may be computationally intensive, as the network composition may change rapidly based on the input. Accordingly, manual identification rewiring of a network comprising many neurons of different types that is capable of real time visual processing may require computational power that exceeds the capability of video processing devices, particularly portable devices.

Consequently, there is a need for an improved plasticity mechanism to adaptively affect network connectivity in order to realize a spiking neuron network capable of reliably identifying salient features within a wide variety of inputs.

SUMMARY OF THE DISCLOSURE

The present disclosure satisfies the foregoing needs by providing, inter alia, apparatus and methods for implementing adaptive plasticity in spiking neuron networks that may be dynamically adjusted in accordance with the connection activity thereby enhancing performance of a neural network.

In one aspect of the innovation, computerized spiking neuron network processing apparatus is disclosed. In one embodiment, the apparatus includes a storage medium, the storage medium comprising a plurality of executable instructions configured to, when executed, process sensory input representative of at least first and second features, by at least: based on the input, cause neurons of a first portion of a neuron network to respond to the first feature and neurons of a second portion of the network to respond to the second feature; and based on a first rule, potentiate a first plurality of inhibitory connections associated with the first portion of the network, individual ones of the first plurality of inhibitory connections configured to provide inhibitory signals between individual neurons within the first portion.

In one variant, the first rule is characterized by a first inhibitory efficacy configured to suppress the response of the neurons of the first portion to the first feature.

In another variant, the instructions are further configured to, when executed: based on a second rule, adjust a second plurality of inhibitory connections, individual ones of the second plurality of inhibitory connections configured to provide inhibitory signals between neurons of the first portion and neurons of the second portion. The second rule is characterized by e.g., a second inhibitory efficacy, the second efficacy being lower than the first inhibitory efficacy; and the first rule and the second rule cooperate to enable the neurons of the second portion to respond to the second feature.

In another aspect, a method of updating an efficacy of inhibitory connections of a spiking neuron network is disclosed. In one embodiment, the method includes, for an input signal: based on a first rule, potentiating a first plurality of inhibitory connections associated with the first portion the network, individual ones of the first plurality of inhibitory connections and a second plurality of inhibitory connections configured to provide inhibitory signals to neurons of the first and the second portions, respectively; based on a second rule, potentiate the second plurality of inhibitory connections.

In one variant, neurons of the first portion are configured to respond to the first feature; neurons of the second portion are configured to respond to the second feature; individual ones of the first and the second pluralities of inhibitory connections are configured to provide inhibitory signals to neurons of the first and the second portions, respectively; the first rule is configured to cause a first inhibitory signal; the second rule is configured to cause a second inhibitory signal that is smaller than the first inhibitory signal; and the first rule and the second rule cooperate to suppress the neurons of the first portion from response to the first feature.

In another aspect, a computerized spiking neuron network visual input processing system is disclosed. In one embodiment, the system includes: a sensing apparatus configured to acquire a frame of the visual input, the frame associated with a first location; and logic configured to generate a saliency map based on identifying a salient feature in the frame, the salient feature characterized by a second location.

In one variant, the frame comprises a representation of the salient feature and one or more other features; the first portion of neurons of the network is configured to respond to the salient feature, and the second portion of neurons of the network is configured to respond to at least one of the one or more other features; the identification of the salient feature is based on a lateral inhibition mechanism.

In another variant, in accordance with a first rule, potentiation of a first plurality of inhibitory connections between the neurons of the first portion and the neurons of the second portion; in accordance with a second rule, potentiation of a second plurality of inhibitory connections between the individual ones of the neurons of the second portion; and the second rule is characterized by an inhibitory efficacy configured to suppress response generation by at least some of the neurons of the second portion.

In another aspect, a computer readable apparatus is disclosed. In one embodiment, the apparatus includes a medium having at least one computer program disposed, thereon, the at least one program configured to, when executed, generate a saliency map based on identifying a salient feature in one or more frames of visual data.

In one variant, the one or more frames comprise a representation of the salient feature and one or more other features; a first portion of neurons of a network is configured to respond to the salient feature, and a second portion of neurons of the network is configured to respond to at least one of the one or more other features. The identification of the salient feature is based on a lateral inhibition mechanism.

Further features of the present disclosure, its nature and various advantages will be more apparent from the accompanying drawings and the following detailed description.

Figure 1:
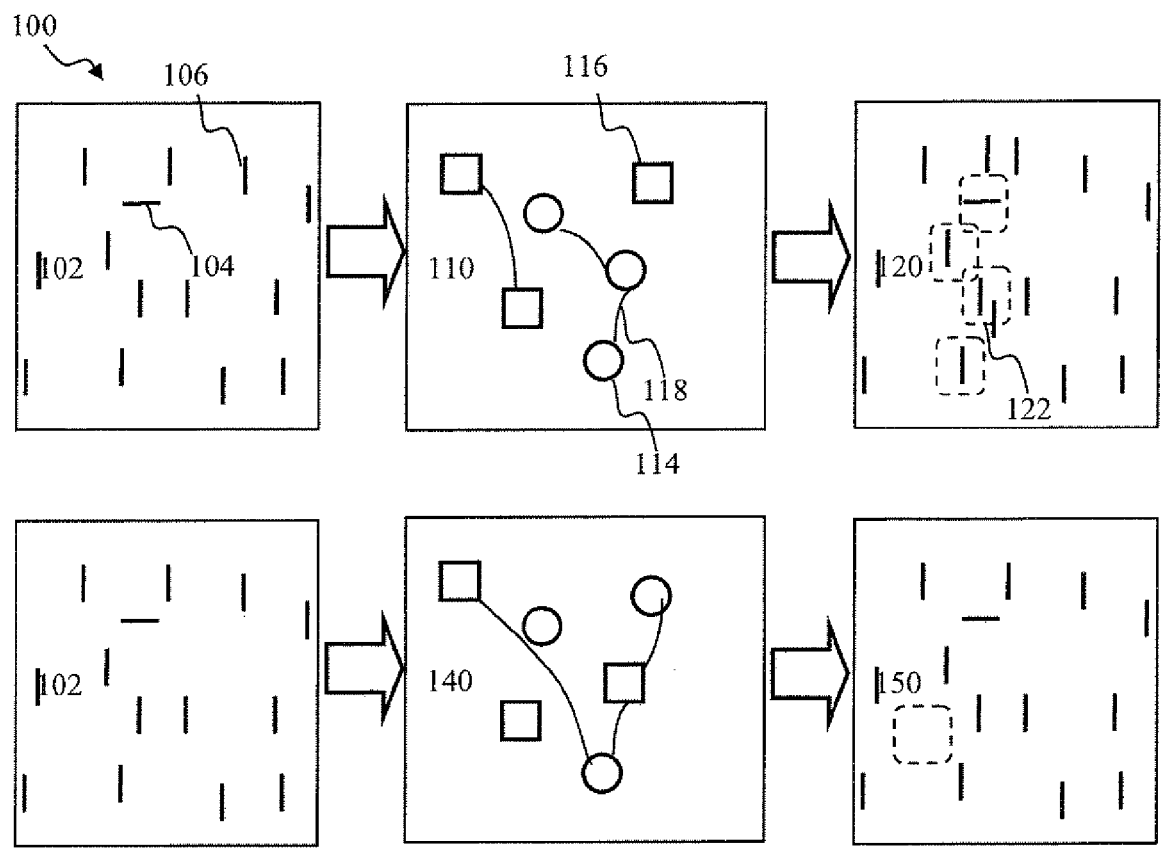
FIG. 1 is a block diagram depicting feature identification by an artificial spiking neural network according to the prior art.

All Figures disclosed herein are © Copyright 2012 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations and implementations are possible by way of interchange of or combination with some or all of the described or illustrated elements. Wherever convenient, the same reference numbers will be used throughout the drawings to refer to same or like parts.

Where certain elements can be partially or fully implemented using known components, only those portions of such known components that are necessary for an understanding of the various features of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, RFID or NFC, millimeter wave or microwave systems, acoustic, infrared (i.e., IrDA), and/or other wireless interfaces.

Overview

The present disclosure provides, in one aspect, apparatus and methods for implementing activity-based plasticity mechanisms configured to, inter alia, aid salient feature detection by artificial spiking neuron networks processing sensory data.

In some implementations, the processing may comprise determination of two or more plasticity rules based on an analysis of output of neurons encoding visual stimulus. The individual plasticity rules may be applied to one or more groups of neurons of the network.

In one or more implementations, the processing network may initially comprise one or more neurons that are feature agnostic (e.g., may respond to any feature within the input). During network training, different neurons may develop (emerge) preferential responses to particular features. The feature selective units may elicit strong response when they are presented with the input comprising the matching feature. By way of illustration, when processing visual scenes, red-color selective units may respond strongly when they are presented/stimulated with scenes comprising red objects. In one or more implementations, the visual scenes may correspond to traffic imagery and red objects may comprise red traffic lights. Red-selective may unit respond when they 'see' the red light. The red-selective unit may not respond for green light. Similarly, the orientation selective units may respond strongly when their matching orientation (e.g., vertical) is present within the input, and may respond weakly for non-matching orientation (e.g., horizontal).

In some implementations, unit selectivity may be aided by selective inhibition. In the above traffic processing example, two or more red (and/or green) color selective units may inhibit one another with red-to-red (and/or green-to-green) inhibitory connections. Such intra-selectivity inhibition may be referred to as the strong red-to-red/green-to-green inhibitory connections. The red color selective units may not inhibit the green color selective units. The green color selective units may not inhibit the red color selective units. Such inter-selectivity inhibition may be referred to as the weak red-to-green inhibitory connections.

In one or more implementations, the plasticity mechanism used in establishing the inter- and the intra-selectivity inhibition may comprise adaptive plasticity mechanism based on a similarity measure (e.g., a cross-correlogram, cross-correlation, convolution, differential entropy, and/or mutual information) between outputs of units of two or more selectivity groups (e.g., the red and the green).

In some implementations, as a part of network training, an output of one unit (e.g. red) may be compared to the output of other units from the same selectivity. An output of one unit (e.g. red) may be compared to (i) the output of other units from the same selectivity (e.g., other red units); and (ii) the output of units from another selectivity (e.g., green units). The adaptive plasticity rule may be constructed by determining a difference between the two similarity estimates. In some implementations, the adaptive plasticity rule may be based on averaged similarity measures.

The activity based adaptive plasticity rule may advantageously aid unit selectivity during network operation subsequent to training. That is, efficacy of inhibitory connections between units responding to similar features may be increased. Efficacy of inhibitory connections between units responding to different features may be reduced. As applied to the above example, inhibitory connection between red-red (green-green) units may become stronger, while inhibitory connections between red-green units may become weaker. Strong inhibitory connections between the red (and/or green) selective units, may cause red/green units to sufficiently inhibit activity (spike output generation) of one another activity. At the same time, red/green units may not inhibit sufficiently the activity of green/red units, respectively. When the input comprises a large portion of red features, the response of the red units may grow progressively weaker and/or less consistent, compared to the response of the green units. As a result, the saliency map may comprise greater emphasis at the green feature location, as illustrated in detail below. A saccade may be generated to the salient feature location.

In another aspect of the disclosure, adaptive adjustment methodologies are used to implement processing of visual sensory information and feature/object recognition using spiking neuronal networks. Portions of the object recognition apparatus can be embodied for example in a remote computerized apparatus (e.g., server), comprising a computer readable apparatus.

Embodiments of the foregoing feature detection functionality of the present disclosure are useful in a variety of applications including for instance a prosthetic device, autonomous robotic apparatus, and other electromechanical devices requiring visual or other sensory data processing functionality.

Methods

Detailed descriptions of the various embodiments and implementations of the apparatus and methods of the disclosure are now provided. Although certain aspects of the disclosure can best be understood in the context of processing visual information using spiking neural networks, the disclosure is not so limited, and implementations of the disclosure may also be used in a wide variety of other signal processing applications, including for instance in processing of other sensory signal modalities (e.g., sound waves, radio frequency waves, etc.) and/or implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

Figure 2:
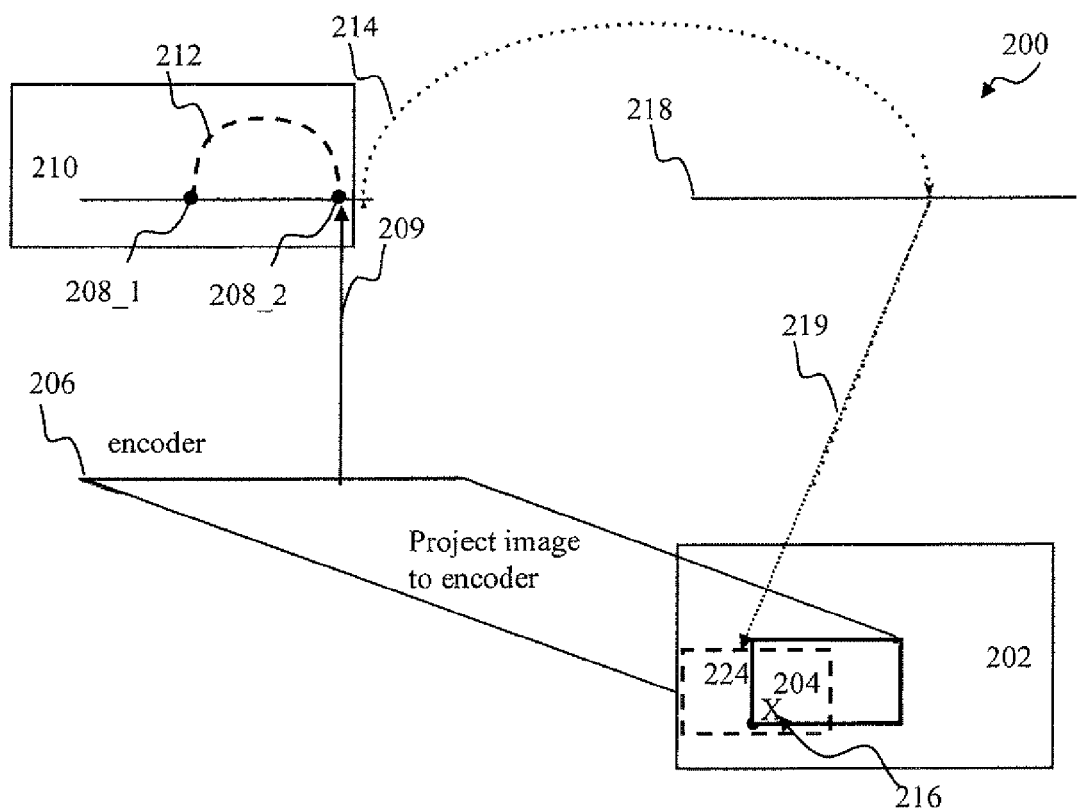
FIG. 2 is a block diagram depicting image processing apparatus comprising activity based salience map generation, in accordance with one or more implementations of the present disclosure.

FIG. 2 illustrates one implementation of an image processing apparatus comprising an activity-based salience map generation methodology of the present disclosure. An area 204 within the visual scene 202 may comprise a salient feature 216 (denoted as 'X' in FIG. 2). The area 204 may correspond to an aperture of a lens, an imaging sensor array (comprising RGCs, a charge coupled device (CCD) or CMOS device, or an active-pixel sensor (APS)), an optic of an eye, etc. The area 204 may be referred to as an image. The image 204 may be projected (interfaced) to encoder 206. In some implementations, the encoder may comprise spiking retina encoder described, for example, in co-owned and co-pending U.S. patent application Ser. No. 13/539,142, entitled "RETINAL APPARATUS AND METHODS", filed Jun. 29, 2012, co-owned U.S. patent application Ser. No. 13/623,820, entitled "APPARATUS AND METHODS FOR ENCODING OF SENSORY DATA USING ARTIFICIAL SPIKING NEURONS", filed Sep. 20, 2012, and patented as U.S. Pat. No. 9,047,568 Jun. 2, 2015, or co-owned and co-pending U.S. patent application Ser. No. 13/623,838, entitled "SPIKING NEURON NETWORK APPARATUS AND METHODS FOR ENCODING OF SENSORY DATA", filed Sep. 20, 2012, each of the foregoing incorporated herein by reference in its entirety. The encoder 206 may convert the image data 204 into spike output using, for example, latency encoding described in co-owned U.S. patent application Ser. No. 13/548,071, entitled "SPIKING NEURON NETWORK SENSORY PROCESSING APPARATUS AND METHODS", filed Jul. 12, 2012 and patented as U.S. Pat. No. 8,977,582 on Mar. 10, 2015, incorporated herein by reference in its entirety. In one or more implementations, the encoder 206 may convert the image data 204 into spike output using, for example, spike rate encoding, and/or spike polychronous patterns as described, for example, in co-owned and co-pending U.S. patent application Ser. No. 13/117,048, entitled "APPARATUS AND METHODS FOR POLYCHRONOUS ENCODING AND MULTIPLEXING IN NEURONAL PROSTHETIC DEVICES", filed May 26, 2011, incorporated herein by reference in its entirety.

The encoded image data may be coupled form the encoder 206 to image processing and/or feature detection block 210 via one or more fee-forward connections 209. The processing block 210 may comprise one or more spiking neurons 208_1, 208_2. The connections 209 may be characterized by a connection efficacy. Efficacy refers in one implementation to a magnitude and/or probability of input spike influence on neuronal response (i.e., output spike generation or firing). Efficacy may comprise, for example a parameter (e.g., synaptic weight, probability of transmission, and/or other parameter) by which one or more state variables of the neurons 208 may be changed.

Connection efficacy may be changed in accordance with one or more STDP rules. In some implementations, individual connections may utilize connection-specific rules. Different classes of connections (e.g., feed-forward, lateral, and/or feedback) may in one implementation utilize type-specific common STDP rules.

In some implementations, the STDP rule may comprise an adaptive STDP mechanism that may be determined in real time by a network entity and/or another entity as described, for example, in co-owned and co-pending U.S. patent application Ser. No. 13/660,923, entitled "ADAPTIVE PLASTICITY APPARATUS AND METHODS FOR SPIKING NEURON NETWORK", incorporated supra.

The neurons 208 may be configured to respond preferentially to one or more features within the image 204. In some implementations, the first neuron 208_1 may be configured, for example, to respond to the feature 216, while the second neuron 208_2 may be configured, to respond to a feature other than 'X' in FIG. 2. Such neurons, 201_1, 208_2 may be referred to as the neurons of different class (e.g., responding to different feature set). Neurons 208 may further be configured to inhibit one another via the inhibitory contention 212. The connections 212 may be characterized by a connection efficacy of the type previously described.

The processing block 210 may detect the salient feature 216 in the image 204. In some implementations, the block 210 may communicate a saliency map (comprising, for example coordinates of the salient feature 216) to the saccading block 218 via the connections 214. In some implementations, the feature coordinates may be determined based on the spatial position of the neurons that may respond to the feature. By way of a non-limiting example, the neurons 208_1, 208_2 may be spatially arranged and the connections to the saccading block may comprise a topographic coordinate parameter. In some implementations, the block 218 may accumulate information from other parts of the visual field (e.g., other neurons of the processing block 210). The block 218 may further process information related to spatial position features within the visual field 204 that cause activity of the neurons of the block 210. In one or more implementations, the block 218 may produce a saliency map that may be used to determine the saccading location (e.g., the field 224) within the scene 202.

The block 218 may generate one or more commands in order to saccade the aperture to the location of the salient feature 216, thereby causing the image 224 to be acquired. In one or more implementations, the saccading block may comprise one or more actuators configured to reposition, for example, the imager lens so that the salient feature is in the center of the aperture (e.g., the image 224). In some implementations (not shown), the saccading block 218 may be embedded within the image processing block 210.

Figure 3:
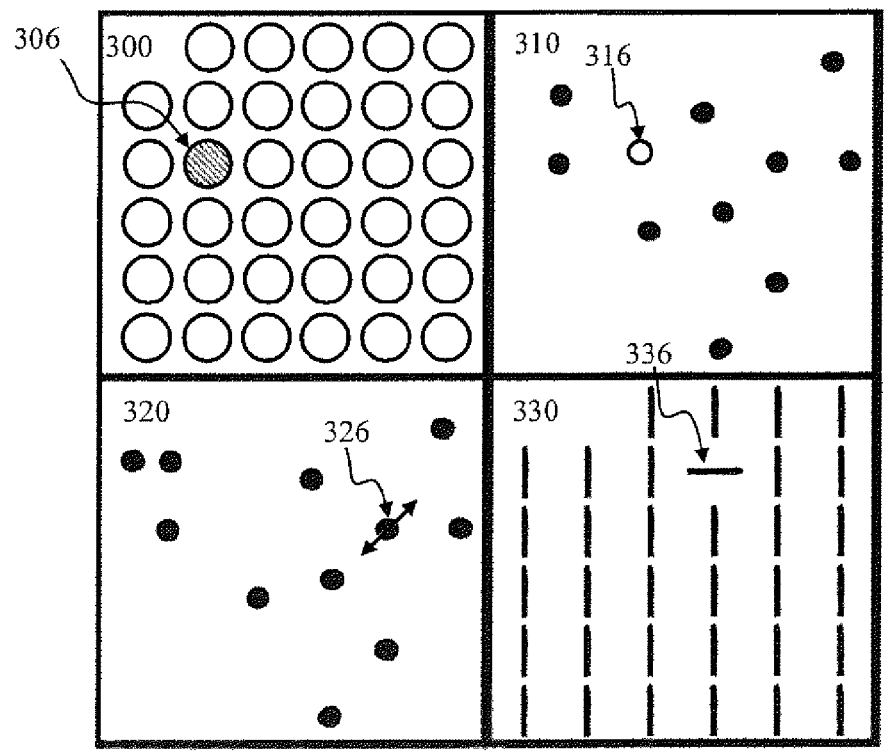
FIG. 3 is a graphical illustration of exemplary salient feature types useful with the image processing apparatus of FIG. 2 according to one or more implementations.

FIG. 3 illustrates exemplary salient feature types useful with the image processing apparatus 200 of FIG. 2. The salient feature (e.g., the feature 216 of FIG. 2) may comprise one or more characteristics that make it distinct from the background and/or other features. Such characteristics may include of example luminance (e.g., a single darker circle 306 relative other circles in the panel 300); color: (e.g., a single white circle 316 among black circles in the panel 310); motion: e.g., a single mobbing circle 326 relative stationary circles in the panel 320); and/or orientation (e.g., a single horizontal bar 336 among vertical bars in the panel 330). It will be recognized by those skilled in the arts that many other object characteristics may be equally compatible and useful with the disclosure, for example, polarization, texture, and/or others).

Figure 4A:
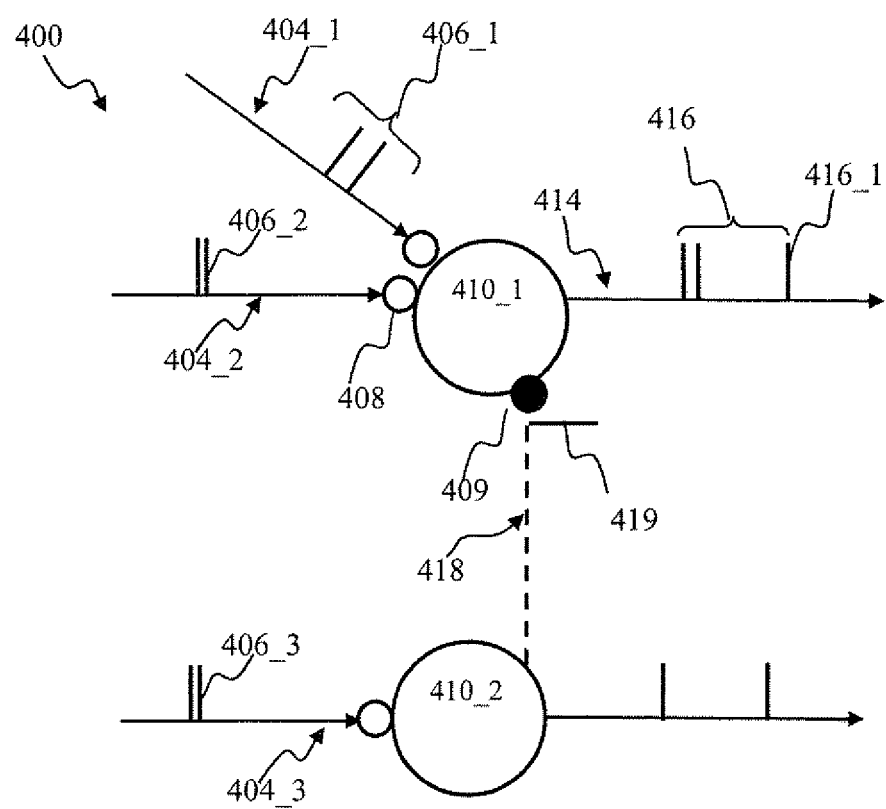
FIG. 4A is a block diagram depicting an artificial spiking neuron network according to one or more implementations.

FIG. 4A illustrates one exemplary implementation of a spiking neuronal network of the image processing block 210 of FIG. 2. The network 400 may comprise one or more units (e.g., spiking neurons) 410. The units 410 may be configured to receive feed-forward spiking input 406 (e.g., the input 209 in FIG. 2) via one or more connections 404. In some implementations, the neuron (e.g., the neuron 410_1) may receive inhibitory input 419 from another neuron (e.g., 410_2 in FIG. 4A) via one or more inhibitory connections 418. In some implementations (not shown), the first neuron 410_1 may provide an inhibitory signal to the second neuron 410_2, thereby effectuating mutual inhibition. The inhibitory connection 418 may be characterized by an efficacy, depicted by the solid circle 409 in FIG. 4A.

In one or more implementations, the inhibition may be configured to directly affect neuron excitability. By a way of a non-limiting example, the neuron excitability may be reduced proportional to the magnitude of the value of inhibition signal.

In some implementations, the inhibition may be utilized as a gating parameter affecting output spike generation by the neuron. Spike generation by a neuron may be based on, for instance, a parameter E describing strength of excitatory input into the neuron (e.g., by the feed-forward input 406 in FIG. 4A). By a way of a non-limiting example, a strong input excitation may correspond to $E \geq 2$; moderate excitation may correspond to $2 > E \geq 1$; and weak excitation correspond to $E < 1$. In some implementations, in absence of other inputs, strong excitation may be characterized by a high probability of neuronal response (e.g., $P > 0.9$); weak excitation may correspond to a low probability of neuronal response (e.g., $P < 0.1$) and moderate excitation correspond to probability of neuronal response of e.g., about 0.5. As will be appreciated by those skilled in the arts, the above numbers comprise one or more exemplary implementations, and other probability ranges may be utilized so long that strong excitation corresponds to higher response probability compared to moderate excitation, and weak excitation corresponds to lower response probability compared to moderate excitation.

In some implementations, efficacy of the inhibitory connections (e.g., the connection 418 in FIG. 4A) may be characterized by an inhibitory parameter B. In one or more implementations, strong inhibition may correspond to $B \geq 1$; while weak inhibition may correspond to $B < 0.1$. Strong inhibition may be sufficient to suppress neuron response even when excitatory input is strong. Weak inhibition may not be sufficient to suppress neuron response due to strong and/or moderate excitatory input (e.g., $E \geq 1$). Weak inhibition may suppress neuron response due to weak excitatory input (e.g., $E < 1$). In some implementations, neuron response suppression may be characterized by $P = 0$ (no response altogether); while in some implementations the suppressed neuron may respond with a low probability (albeit non-zero, such as e.g., $P \sim 0.01$).

The strength of the neural response may be configured based for instance on the strength of the excitatory input, and/or on the strength of the inhibitory input. In some implementations, the strength of the neural response may be characterized by the latency of the output spike referenced to a time base. The time base may comprise an input time (e.g., video frame time). In some implementations, the time base may comprise a timer event, and/or other signal. In one or more implementations, the strength of the neural response may be characterized by the number of spikes emitted by the neuron in a short time window (e.g. 100 ms) after the arrival of the input. By a way of a non-limiting example, a strong excitatory input may trigger the neuron to generate one (or more) spikes, where the first spike may be characterized by a latency L1 relative to the arrival of the input to the neuron. A weaker input may trigger one spike with a latency L2 that is substantially longer, as compared to the L1 latency. In some implementations, the L1 value may be selected at 1 ms (or shorter). The L2 value may be configured to be greater than or equal to about 100 ms.

The neurons 410 may generate output (e.g., a spike) using any of a number of possible methodologies, such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", co-owned and co-pending U.S. patent application Ser. No. 13/152,119 filed on Jun. 2, 2011, and entitled "SENSORY INPUT PROCESSING APPARATUS AND METHODS", each of the foregoing incorporated herein by reference in its entirety. In one or more implementations, the neuron spike generation mechanism may comprise input scaling and/or firing threshold adjustment, as described for example in U.S. patent application Ser. No. 13/623,820, entitled "APPARATUS AND METHODS FOR ENCODING OF SENSORY DATA USING ARTIFICIAL SPIKING NEURONS", incorporated supra. The spikes of the neuron 410 may be propagated via the connection 414.

Connections 404 may be characterized by a connection efficacy, depicted by open circles 408 in FIG. 4A. Connection efficacy may be adjusted in accordance with, e.g., a plasticity mechanism. In one or more implementations, the plasticity mechanism may be adaptively configured based on a similarity measure (between neuron output (e.g., the output 416) and the neuron input (e.g., the input 406_1, 406_2, 419 in FIG. 4A), as described in detail in co-owned and co-pending in U.S. patent application Ser. No. 13/660,923, entitled "ADAPTIVE PLASTICITY APPARATUS AND METHODS FOR SPIKING NEURON NETWORK", incorporated supra. In one or more implementations, the similarity measure may be based on one or more of a cross-correlogram measure and/or mutual information measure.

Figure 4B:
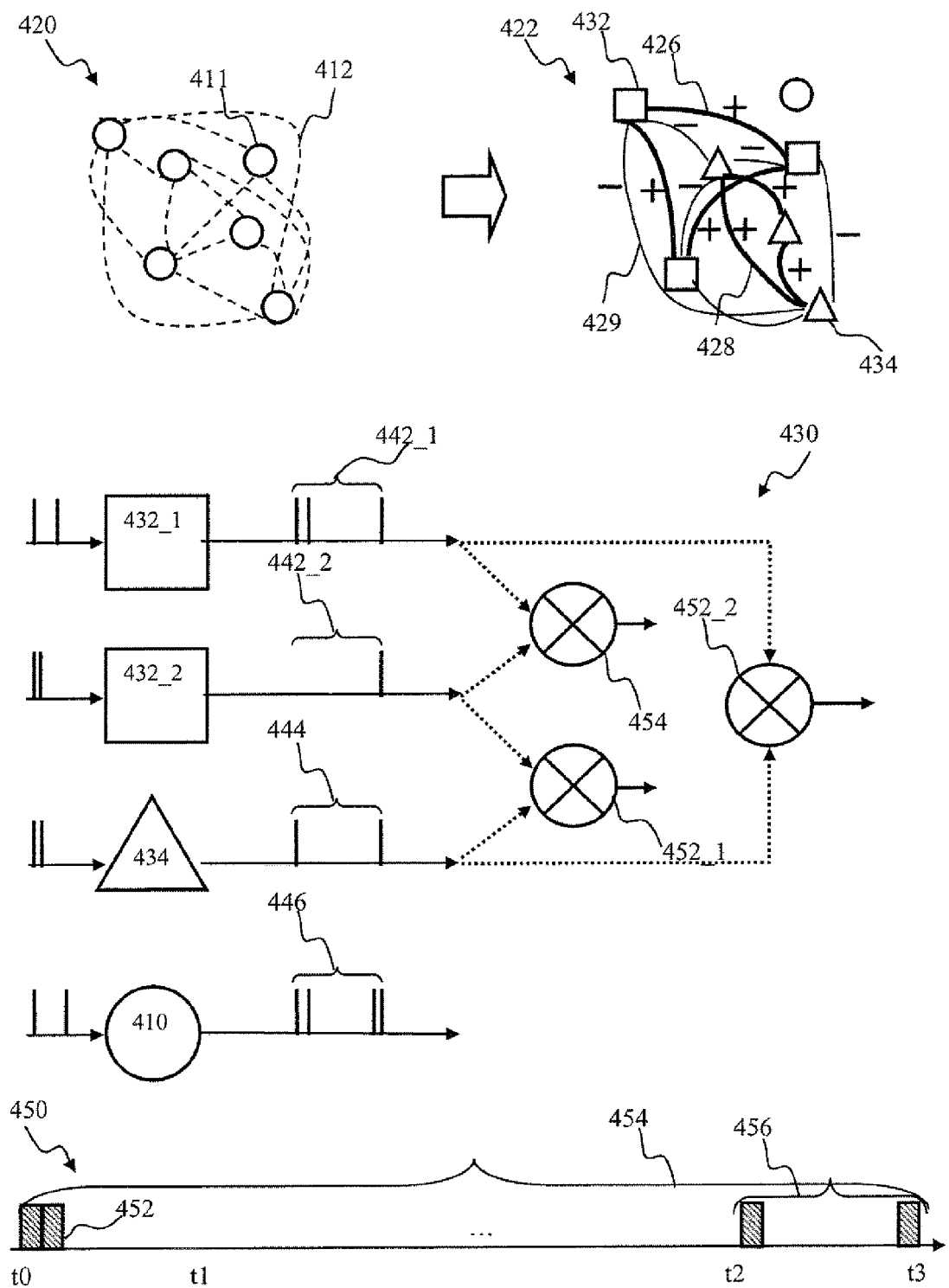
FIG. 4B is a block diagram depicting encoder unit specificity attainment and plasticity development during training, according to one or more implementations.

FIG. 4B illustrates unit specificity attainment and plasticity development by the encoder 210 of FIG. 2 during training, according to one or more implementations. The panel 450 in FIG. 4B illustrates an operational timeline of the network 420.

In one or more implementations, at time t0, the processing network (e.g., the network 400 of FIG. 4A, and/or network 420 of FIG. 4B) may initially comprise one or more neurons 411 (e.g., the neurons 410 of FIG. 4A) that are feature-agnostic (e.g., may respond to any feature within the input). The neurons 411 of the network 420 may be interconnected by a plurality of connections 412. The connections 412 may be configured to provide one-way or mutual lateral inhibition between neurons 411. In some implementations, the connectivity between the neurons may be all-all (i.e., individual neuron may be connected to all neurons of at least a portion of the network). In one or more implementations, the network portion may be selected based on a spatial parameter, such as a coordinate described in detail in U.S. patent application Ser. No. 13/385,938 entitled "TAG-BASED APPARATUS AND METHODS FOR NEURAL NETWORKS" filed on Mar. 15, 2012 and patented as U.S. Pat. No. 8,712,939 on Apr. 29, 2014, incorporated herein in its entirety. In some implementations, other connectivity patterns may be employed, such as, for example, one-to-one, one to-many, one-to-all, subset-to subset, and/or other patterns.

During network training, different neurons may develop (emerge) preferential responses to particular features, as illustrated by the networks 422, 430 in FIG. 4B. Based on the feed-forward input comprising one or more frames 452 (e.g., the input 209 in FIG. 2) at time t1, one or more of the circle units 411 may learn to respond to, for example, horizontal features in the input image frame (e.g., as in the frame 600 in FIG. 6A). Such horizontal-specific units are depicted by the squares 432_1, 432_2 in FIG. 4B,) and may be referred to as the 'squares'. Similarly, one or more of the circle units 411 may learn to respond to, for example, vertical orientation in the input image. Such vertical-specific units are depicted by the triangles 434 in FIG. 4B, may be referred to as the 'triangles'. In some implementations, one or more circles (e.g., configured to respond to a slanted feature) may remain unspecific due to, for example, insufficient (and/or absent) slanted stimulus in the input frames 452. The circle units may generate output 446 in FIG. 4B.

The feature selective units (e.g., the squares 432, and/or the triangles 434) may elicit strong response when they are presented with the input comprising the matching feature. In some implementations, unit selectivity may be aided by selective inhibition. As the network (e.g., the network 420 of FIG. 4B) develops feature specificity, it may comprise the network 422 of feature-specific units.

The feature selectivity of the network 422 may be based, at least partly, on a differentiation between the intra-unit inhibitory connections 426, 428 and inter-unit connections, 429. The connection may develop during learning so that a portion of the original lateral connections 412 of the network 420 may be transformed into the inter-unit connections. Another portion of the original lateral connections 412 of the network 420 may be transformed into the intra-unit connections.

Two or more square units 432 (and/or triangle units 434) may inhibit one another with square-to-square (and/or triangle-to-triangle) inhibitory connections 426, 428, respectively in FIG. 4B, as described in detail with respect to FIG. 6A, below. Such inhibitory connections 426, 428 may be referred to as "strong intra-selectivity inhibition", and are depicted with thick lines denoted by the sign '+' in FIG. 4B.

The vertically selective units (e.g., the triangles in FIG. 4B) may provide weaker inhibition to the horizontally selective units (e.g., the squares in FIG. 4B). Similarly, the horizontally selective units may provide weaker inhibition to the vertically selective units. Such inhibitory connections 429 in FIG. 4B may be referred to as "weak inter-selectivity inhibition", and are depicted with thin lines denoted by the sign '−' in FIG. 4B.

In some implementations, the square (and/or the triangle) units may not inhibit one another when the efficacy of the triangle-to-square and square-to-triangle synapses 429 in FIG. 4B is not sufficiently high to cause inhibition. In one or more implementations, the square (and/or the triangle) units may weakly inhibit one another.

In one or more implementations, the output 442 of the squares and/or 444 of triangles may be used to derive an inhibitory plasticity mechanism for use with the connections 426, 428, 429. In some implementations, the output 442_1 of one square may be compared with the output of one or more other squares (e.g., the output 442_2), as illustrated by the inter-selectivity operator 454 in FIG. 4B. In some implementations, the output 442_1 of one square may be compared with the output of one or more triangles (e.g., the output 444), as illustrated by the intra-selectivity operators 452_1, 452_2 in FIG. 4B. In some implementations, the output 444 of one triangle may be compared with the output of one or more squares (e.g., the output 442_1, 442_2).

In some implementations, output comparison between all available square-to-square pair combinations may be computed. In one or more implementations, outputs of a subset of the square unit population may be evaluated. The subset may be for example randomly selected, or selected according to other ciretia. In one or more implementations, the output record may comprise the whole learning window 454, or a portion thereof.

In one or more implementations, the plasticity mechanism used in establishing inter- and intra-selectivity inhibition may be comprise an adaptive plasticity mechanism based on the output activity comparison (e.g., the output of the operators 452, 454); e.g., determining a similarity measure C. In some implementations, the similarity measure may comprise one or more of a cross-correlogram, cross-correlation, convolution, differential entropy, and/or mutual information between the outputs 422, 444.

Figure 12:
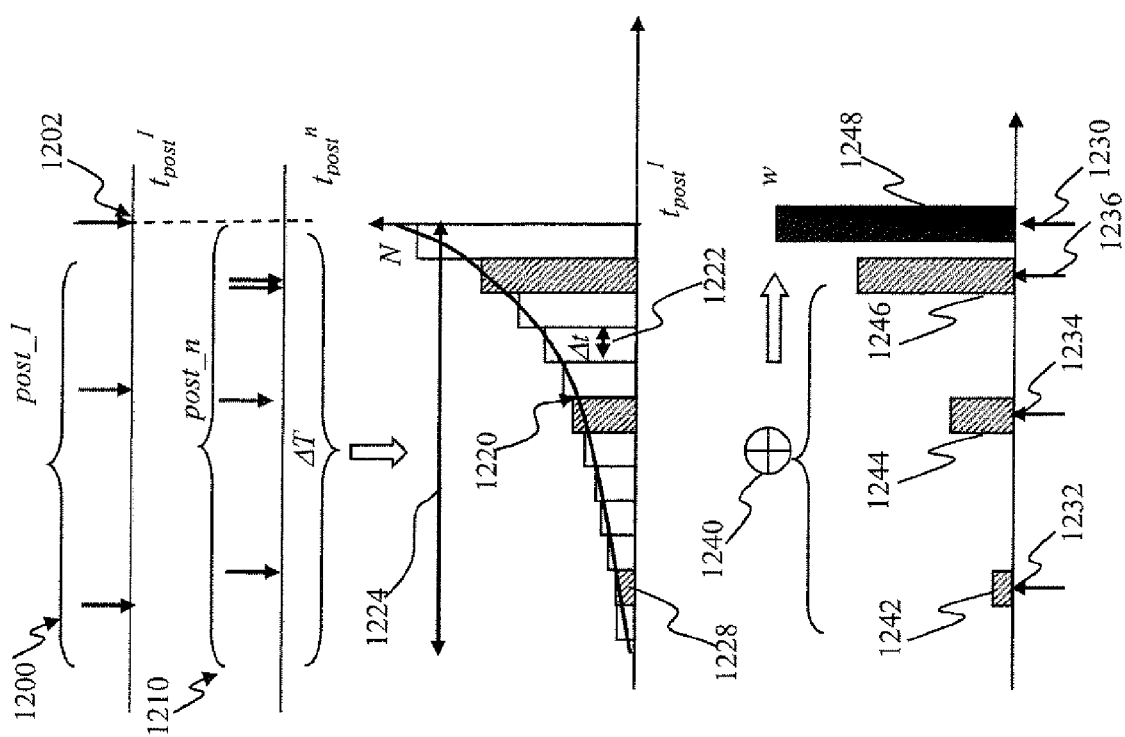
FIG. 12 is a graphical illustration depicting histogram determination based on post-synaptic and pre-synaptic activity of a unit of the spiking network of FIG. 4B, according to one implementation.

FIG. 12 illustrates one implementation of such an adaptive mechanism. When the neuron generates an output (fires a spike 442_1 in FIG. 4B, and/or spike 1202 in FIG. 12) at time $t_{post}$, the cross-correlogram may be determined based on (i) a time record of post-synaptic response of another neuron (e.g., the output 442_2, in FIG. 4B, and/or output 1210 in FIG. 12) during a time interval $t_{post}^i - \Delta T$; and (ii) a time record of post-synaptic output (e.g., the output 1200 in FIG. 12) by the neuron within the same time interval $\Delta T$ 1224. In some implementations for processing of visual input refreshed at 40 ms intervals (25 frames per second), the time interval $\Delta T$ may be selected, from the range between 1 and 1000 ms, preferably 40 ms. It will be appreciated by those skilled in the arts, that the interval $\Delta T$ may be adjusted in accordance with the temporal characteristics of the input. In some implementations adapted to process, for example, high-speed imagery, the plasticity interval may be shortened. In implementations adapted to process, for example, medical ultrasonograms and/or seismic imagery, the plasticity interval may be increased.

In one or more implementations, multiple correlogram estimates (associates with multiple post-synaptic responses 1202) may be averaged to produce a time-averaged similarity measure 1220. In some implementations, the average histogram 1220 may be computed by averaging over the last 1000 spikes across all input synapses or may be computed by averaging over the last 100 second time period. In one or more implementations (not shown), the averaged similarity measure may be determined by e.g., averaging similarity measures of two or more neuron pairs (e.g., the neurons 432, 434 in FIG. 4B).

In some implementations, individual spikes (e.g., the spike groups 1200, 1210 in FIG. 12) may be assigned the same amplitude (e.g., binary 1). Accordingly, the binary correlogram 1220 may be interpreted as a histogram of other neuron activity within individual time slots (bins) 1222 prior to the response of the neuron. In some implementations, the time step (bin width) 1222 may be selected equal to 1 ms. The contents of bins that correspond to one or more activity pulses (e.g., the spikes 1210 in FIG. 12) may be incremented, as depicted by the hashed bins (e.g., the bin 1228) in FIG. 12.

An averaged similarity measure (e.g., the correlogram 1220) may be used to construct plasticity rules for the connections of the neuron, as described in detail below with respect to FIG. 5.

Returning now to FIG. 12, when the neuron (e.g., the neuron associated with the trace 1202 post_1) generates post-synaptic response (1230 in FIG. 12), the history of activity of other neurons may be evaluated. One or more activity pulses (the spikes 1232, 1234, 1236) may be identified within the time window ΔT, prior to the neuron response spike 1230. Plasticity components (e.g., the components 1242, 1244, 1246), corresponding to the activity times $t_{post\_n}^i$ of the identified pulses 1232, 1234, 1236, may be combined by an operator 1240 to produce efficacy adjustment w 1248. In some implementations, the adjustment may be performed based on an event, such as timer expiration, buffer overflow, external (reward) indication, and/or other event types).

Figure 5:
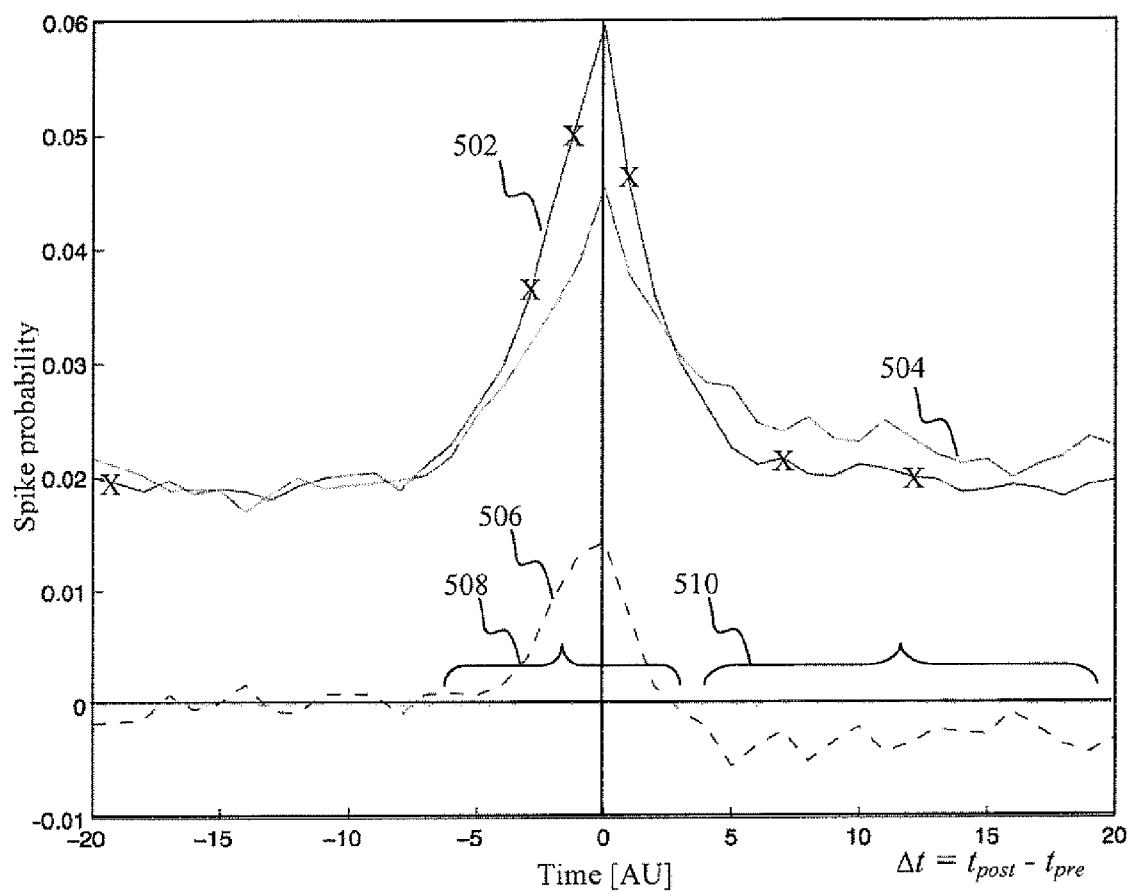
FIG. 5 is a plot presenting simulations data illustrating activity based plasticity for use for example in the processing apparatus of FIG. 2, in accordance with one or more implementations.

FIG. 5 presents performance results obtained during simulation and testing by the Assignee hereof, of exemplary computerized spiking network apparatus configured to implement image processing framework (described above with respect to FIGS. 2-4B). The curve 502 in FIG. 5 denotes the intra-selectivity similarity measure based on cross-correlation between output spikes of units responding to two horizontally oriented features. The curve 504 in FIG. 5 denotes the inter-selectivity output comparison based on cross-correlation between output spikes of one unit responding to horizontally oriented features, and a unit responding to vertically oriented features. In one implementation, the similarity measure (such as cross-correlation 502, 504)) may be determined over a longer time-period. In some implementations, the time period may be selected between several seconds to several hours of network operation time. The data used for determining the curves 502, 504 correspond to 200 seconds of network operation processing input frame stream at 25 frames per second. The curves 502, 504 comprise an average of two individual unit-unit estimates.

The adaptive plasticity for use with inhibitory lateral connections (e.g., the connections 426, 428, 429 of the network 422 of FIG. 4B) may be constructed based on a difference between the inter-selectivity similarity measure (e.g., the curve 502 in FIG. 5) and the intra-selectivity similarity estimate (e.g., the curve 504 in FIG. 5). The curve 506 is based on the difference between the curve 502 and 504, respectively.

In some implementations, the adaptive plasticity rule may be based on averaged similarity measures. In some implementations, the plasticity rule R1 (e.g., the curve 506 in FIG. 5) may be determined based on a difference of (i) similarity measure C1 between the output activity of horizontal and horizontal selective units; and (ii) similarity measure C2 between the output activity of horizontal and vertical selective units. In one or more implementations, the plasticity rule R2 may be determined based on a difference of (i) similarity measure C3 between the output activity of vertical and vertical selective units; and (ii) similarity measure C2 between the output activity of horizontal and vertical selective units. In some implementations, the overall plasticity rule may be based on a combination of R1 and R2:

$$R = aR1 + bR2. \quad \text{(Eqn. 1)}$$

where a,b are the combination weights.

The resulting curve 506 in FIG. 5 illustrates the plasticity rule comprising a long term potentiation (LTP) window 508, and a long term depression (LTD) window 510. The x-axis describes the time delay $\Delta t = t_{post} - t_{pre}$, where $t_{pre}$ corresponds to the time of the arrival of the pre-synaptic spike to the post-synaptic unit (e.g., the spike 419 on the connection 418 in FIG. 4A); and $t_{post}$ corresponds to the time of neuron response (e.g., the spike 416 in FIG. 4B). As seen from the curve 502, the intra-selectivity activity (e.g., horizontal-horizontal) occurs substantially contemporaneously with one another, more frequently within the time interval approximately coinciding with the LTP window 506. According to the plasticity curve 506, horizontal-to-horizontal unit connections may be strongly potentiated.

The curve 502 of FIG. 5 describes intra-selectivity activity distribution for $\Delta t = t_{post} - t_{pre}$. When the plasticity curve 506 is sampled using the 502 distribution, the efficacy of the intra-feature connections (such as 426, 428 in FIG. 4B) is more likely to be potentiated (using the portion 508 of the curve 506) than depressed when averaged over time. In other words, when the plasticity rule is applied over a period of time, the time-averaged probability of the connection being potentiated is greater than being depressed.

Similarly, the curve 504 in FIG. 5 describes the inter-selectivity activity distribution for $\Delta t = t_{post} - t_{pre}$. When sampling the plasticity curve 506 with the 504 distribution, the efficacy of the inter-feature connections (such as 429 in FIG. 4B) is more likely to be depressed (using the portion 510 of the curve 506) rather than potentiated when averaged over a time interval.

In some implementations, the averaging interval may be selected as e.g., 1000 seconds or longer.

Applying the STDP mechanism with the plasticity curve 506, the efficacy of the intra-feature connections may become potentiated (i.e., producing a "strong connection"), and the efficacy of the inter-feature connections may become depressed (i.e., producing a weak connection). In some implementations, a ratio of the "strong connection" efficacy to the "weak connection" efficacy may be a factor of 3 or greater.

As seen from the curve 504, $\Delta t = t_{post} - t_{pre}$ for the inter-selectivity activity (e.g., horizontal-vertical) is more widely distributed, with a portion of activity occurring substantially in the interval 508 and a portion of activity occurring substantially in the interval 510. The broader interval 510 (compared to the interval 508) approximately coincides with the LTD portion of the rule 506. According to the plasticity curve 506: (i) at least a portion of the horizontal-to-vertical unit connections may be depressed compared to the horizontal-to-horizontal connections; and (ii) at least a portion of the horizontal-to-vertical unit connections may be depressed. In some implementations, the plasticity mechanism may adjust the efficacy of synapses based, for example, on the curve 506 of FIG. 5, and the time intervals Δt between post-synaptic responses and pre-synaptic spikes. The efficacy adjustment of, for example, the curve 506 may increase connection efficacy (potentiate the connection) when the time intervals Δt fall within the interval range 508. Conversely, the rule of the curve 506 may decrease connection efficacy (depress the connection) when the time intervals Δt fall outside the interval range 508, e.g., within the interval range 510.

In one or more implementations, the plasticity rule based for example on the curve 506, may cause depression of the horizontal-to-vertical neuron connections, when the plasticity rule is applied for a lengthier period (e.g., 1000 (or more) seconds). The plasticity rule based on the curve 506 may cause connection potentiation when the plasticity rule is applied for about 1000 seconds. In some implementations, the connection plasticity may be effectuated for periods in excess of 1000 s.

The dynamic state of the neuron units (e.g., the units 411 in FIG. 4B) may also be periodically updated. In some implementations, the update may comprise a cyclic update effectuated at regular intervals (e.g., 1 ms) as described in detail, for example, in U.S. patent application Ser. No. 13/560,891, entitled "APPARATUS AND METHODS FOR EFFICIENT UPDATES SPIKING NEURON NETWORKS", filed on Jul. 27, 2012, incorporated herein by reference in its entirety. In one or more implementations, the update may be based on the neuron post-synaptic response, as described in detail in U.S. patent application Ser. No. 13/239,259, entitled "APPARATUS AND METHOD FOR PARTIAL EVALUATION OF SYNAPTIC UPDATES BASED ON SYSTEM EVENTS", incorporated herein by reference in its entirety.

Figure 6A:
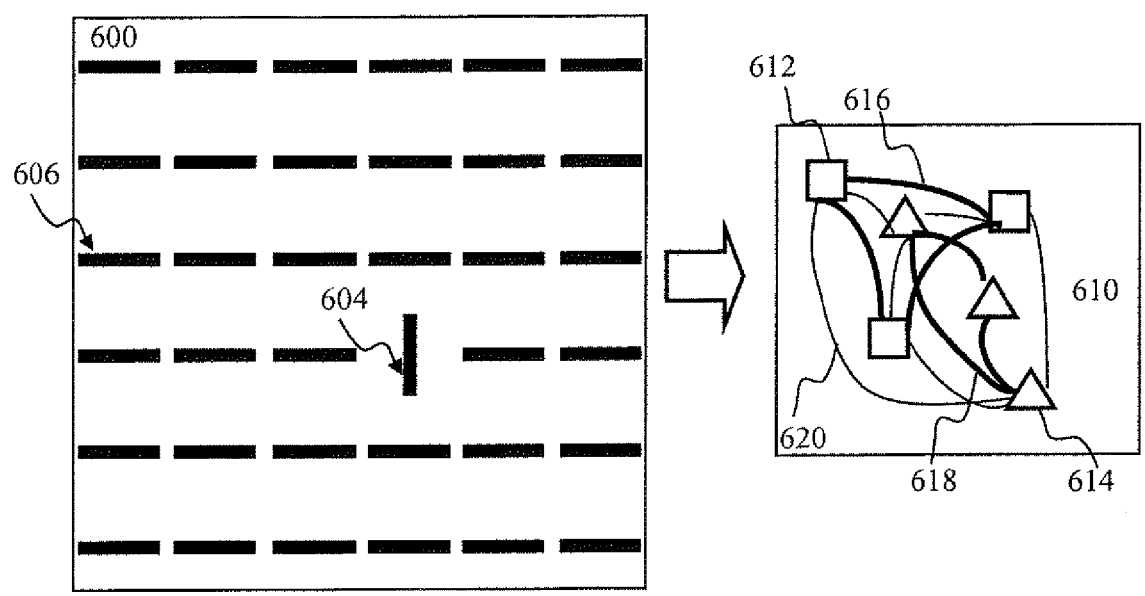
FIG. 6A is a block diagram depicting salient feature detection by an artificial spiking neuron network comprising neurons configured to respond to different features, according to one or more implementations.

FIG. 6A illustrates one implementation of salient feature detection (also referred to as the "pop-up emergence") comprising an adaptive activity-based plasticity mechanism described above with respect to FIGS. 4A-5. The panel 600 illustrates the input image (e.g., the image 204) comprising a horizontally oriented feature 604 and several vertically oriented features 606. The image 600 may be provided to a spiking neuron network processing apparatus (e.g., the apparatus 200 of FIG. 2).

The panel 610 illustrates a spiking neuron network comprising two (or more, not shown) spiking neurons 612, 614 that may develop receptive field such that to respond to vertical and horizontal features within the image 600, respectively. The spiking neuron network 610 may be operable in accordance with the activity based inhibition mechanism comprising:
  the intra-selectivity connections (e.g., 616, 618 in FIG. 6) that may provide strong inhibition to units of the same selectivity, and
  the inter-selectivity connections (e.g., 620 in FIG. 6) that may provide weaker (compared to the connections 616, 618) inhibition to units of different selectivity.

The spiking neuron network 610 may be operable in accordance with the activity based inhibition mechanism:
  the intra-selectivity connections (e.g., 616, 618 in FIG. 6) may provide strong inhibition to units of the same selectivity; and
  the inter-selectivity connections (e.g., 620 in FIG. 6) may provide weaker (compared to the connections 616, 618) inhibition to units of different selectivity.

In one or more implementations, the connections 616, 618, 620 may provide inhibitory input to the units 612, 614. Inhibitory input may be configured to reduce unit excitability and/or move the unit further away from the response-generating state. Unit-to-unit inhibition may be based on an early responding unit inhibiting later responding units, such as using a temporal "winner takes all" methodology described in detail in for example, U.S. patent application Ser. No. 13/548,071, entitled "SPIKING NEURON NETWORK SENSORY PROCESSING APPARATUS AND METHODS", filed Jul. 12, 2012, incorporated supra. When the connections 616, 618 are potentiated, a probability of the units 612, 614, respectively, to generate output spikes may be reduced and/or suppressed altogether. As the frame 600 comprises many more vertically oriented features, activity of the units 612 (e.g., squares) selective to the vertical features may be lower compared to the activity of units 614 responding to horizontally oriented features (e.g., the triangles). Strong inhibitory connections 626 between square units of the network 630 in FIG. 6 may cause inhibition of a large portion (or all) of the square units.

While the number of (strong) inhibitory connections 618 between the triangles 614 may be the similar (or same) at the number of (strong) inhibitory connections 616 between the squares 612, because the input 600 contains fewer vertical features 604, there may be fewer active square units (e.g., the units 612 responding to the feed-forward input). Based on a lower (compared to the input associated with the horizontal features 606) amount of vertical features 604 in the image 600, a fewer number of triangle units may receive strong feed-forward input associated with the vertical features, therefore individual square unit 612 (responding to vertical features) may receive less inhibition from the square-to-square inhibitory connections 616 in FIG. 6A.

The triangle units 614 of FIG. 6A may be strongly activated by the feed-forward input associated with the horizontal features 606. The triangle units 614 may strongly inhibit each other via the triangle-to-triangle inhibitory connections 618.

Weaker inhibitory connections 620 between the square units 612 and the triangle units 614 may cause lower inhibition of the triangle units. The network 610 plasticity configuration may increase probability of the network selectively responding to the salient vertical feature 604, as illustrated by the emergence of the pop-out, as shown in FIG. 6B.

Figure 6B:
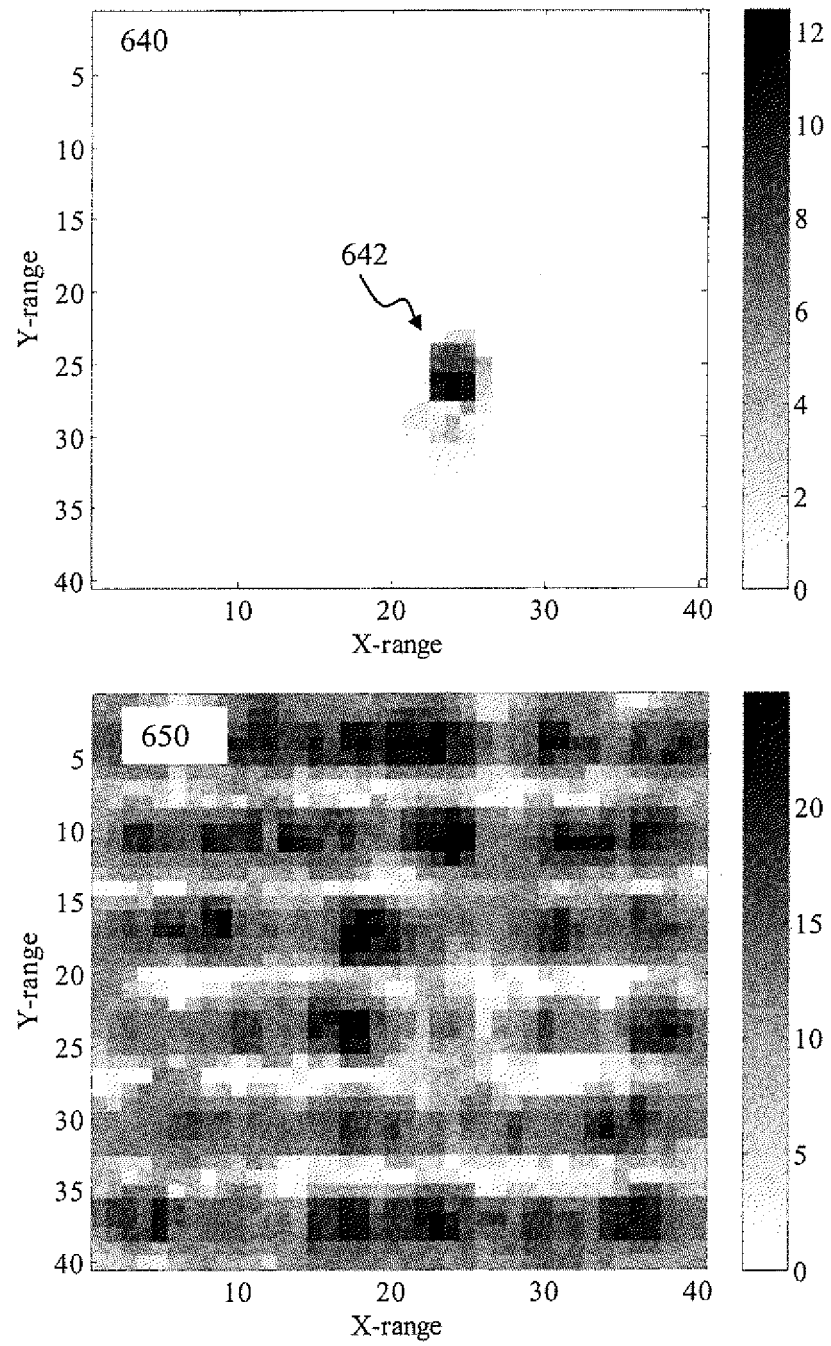
FIG. 6B is a plot depicting a saliency map obtained using adaptive plasticity methodology of the disclosure, according to one or more implementations.

FIG. 6B depicts a saliency map 640 comprising the salient area (the pop-out) 642. Spatial location (X,Y) of the pop-out 642 approximately corresponds to the location of the vertical feature 604 in the input image 600 of FIG. 6A. Comparison of the saliency map 640 obtained using the adaptive plasticity methodology of the present disclosure to a saliency map of the prior art 650 in FIG. 6B, clearly illustrates that the adaptive plasticity methodology of the disclosure is capable of unambiguously isolate the location of the salient feature 604 in the input image 610.

In some implementations, the map 640 may be communicated to an image acquisition block (e.g., the saccading block 216 of FIG. 2) in order to, for example, position a center of the field of view (imaging array aperture) at the salient feature.

Figure 7:
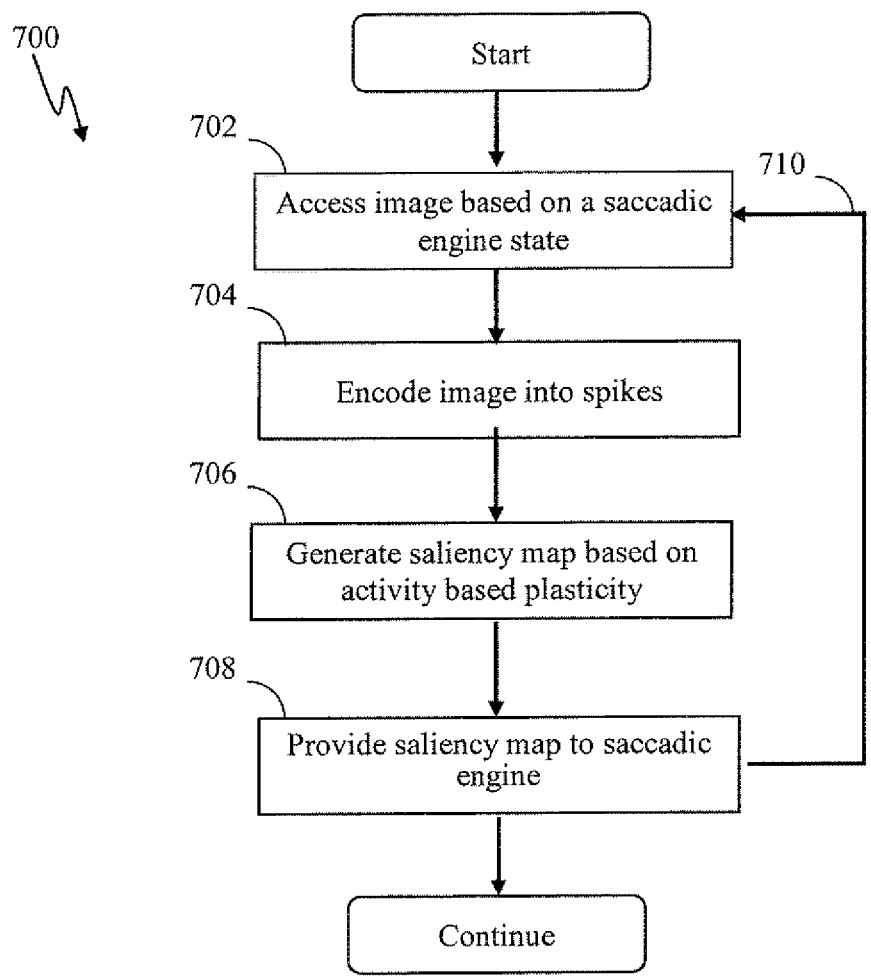
FIG. 7 is a logical flow diagram illustrating a method of determining an adaptive plasticity mechanism, in accordance with one implementation.
Figure 8:
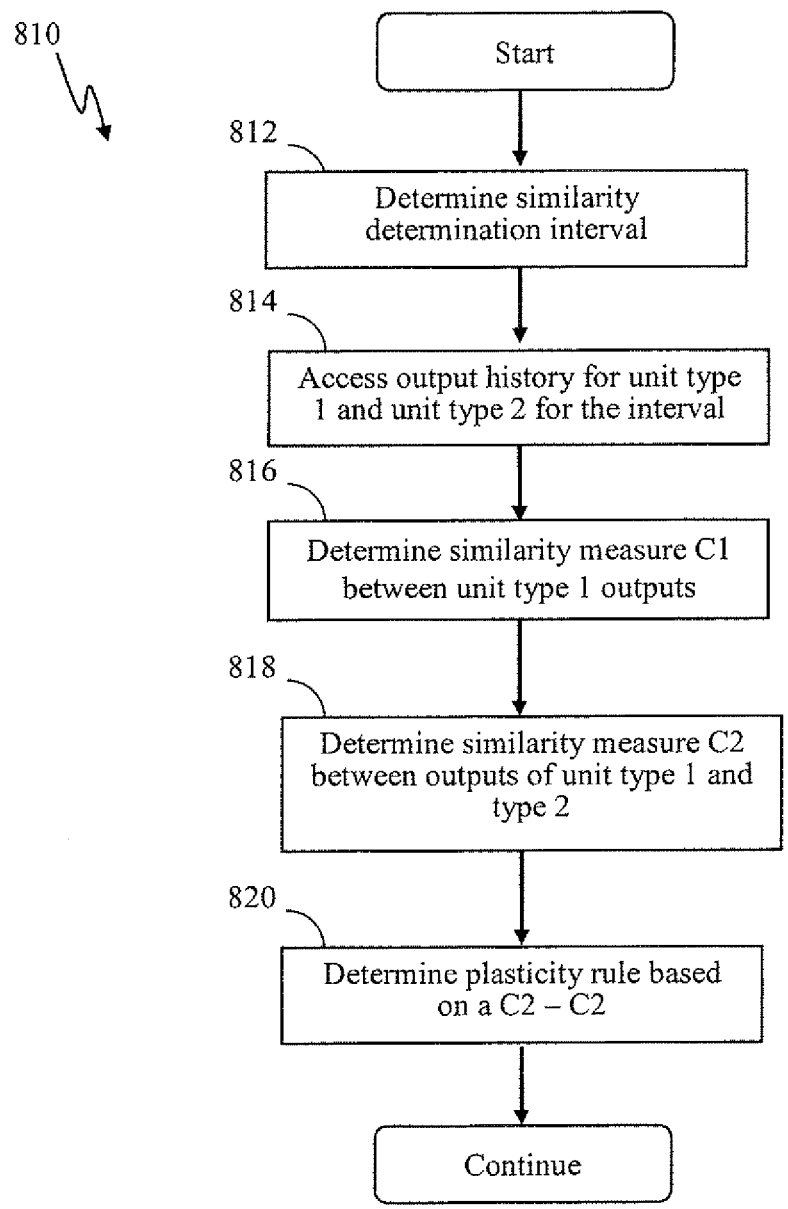
FIG. 8 is a logical flow diagram illustrating a method of determining adaptive plasticity for a spiking neuron comprising multiple input connections, in accordance with one implementation.
Figure 9:
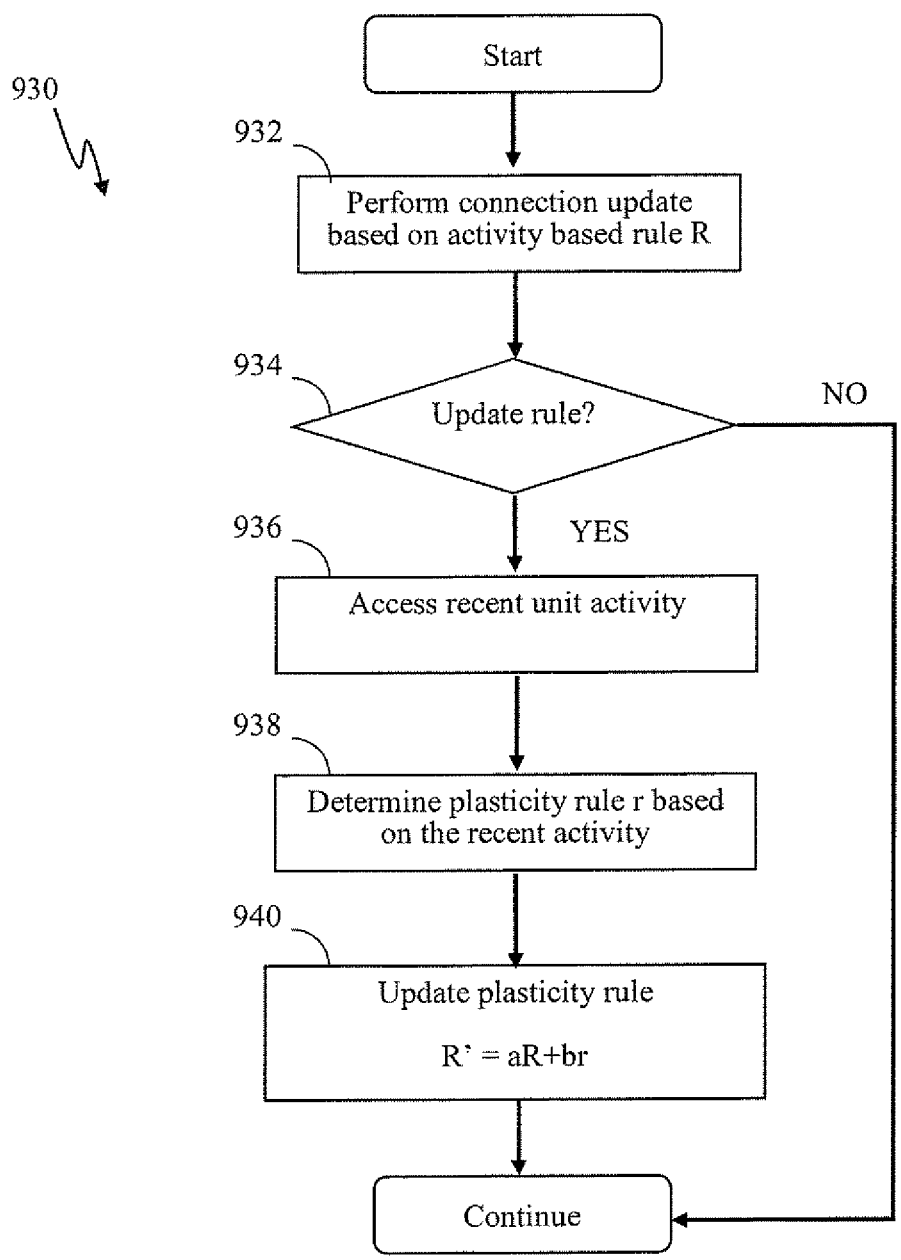
FIG. 9 is a logical flow diagram illustrating a method of connection plasticity update based on the adaptive STDP rule, in accordance with one implementation.

Referring now to FIGS. 7-9, exemplary implementations of adaptive plasticity methods according to the disclosure are described. In some implementations, the methods of FIGS. 7-9 may be used, for example, for operating the neurons 410 of FIG. 4A. Methods of FIGS. 7-9 may be implemented in a connection (e.g., the connection 418 of FIG. 4A). The methods of FIG. 7-9 may also be implemented in a sensory processing apparatus, comprising one or more spiking neuron networks as described with respect to FIG. 10, infra, thereby advantageously aiding, inter alia, accurate and/or timely saccading.

FIG. 7 illustrates a method of determining adaptive plasticity for a spiking neuron based on a similarity measure between neuron input and output, in accordance with one implementation.

At step 702 of method 700, an input image may be accessed. In some implementations, image may comprise a plurality of pixels generated by an imaging array (comprising RGCs, a charge coupled device (CCD), or an active-pixel sensor (APS)). In one or more implementations, the image may comprise a light output of an optic of an eye.

At step 704 of the method 700, the image may be encoded into spikes. In some implementations, the encoding may comprise latency encoding described in co-owned U.S. patent application Ser. No. 13/548,071, entitled "SPIKING NEURON NETWORK SENSORY PROCESSING APPARATUS AND METHODS", filed Jul. 12, 2012 and patented as U.S. Pat. No. 8,977,582 on Mar. 10, 2015, incorporated supra. In one or more implementations, the image data may be converted to spike output using, for example, spike rate encoding, and/or spike polychronous patterns as described, for example, in co-owned and co-pending U.S. patent application Ser. No. 13/117,048, entitled "APPARATUS AND METHODS FOR POLYCHRONOUS ENCODING AND MULTIPLEXING IN NEURONAL PROSTHETIC DEVICES", filed May 26, 2012, incorporated herein by reference in its entirety.

At step 706, a saliency map associated with et encoded spike output may be generated using activity based plasticity mechanism, such as described above with respect to FIGS. 4A-6.

At step 708, the saliency map may be communicated to image acquisition block (e.g., the saccading engine 216 of FIG. 2). The saliency map may be utilized by the image acquisition block to reposition imaging aperture in accordance with the location of salient features.

FIG. 8 illustrates one exemplary method of determining activity based plasticity useful, for example, with the method 700 of FIG. 7.

At step 812 of method 810, an interval for determining activity based plasticity rule may be established. In some implementations, the similarity determination interval may be based on a historical record of spiking neuron activity when processing visual input. The time interval may be selected between several seconds and several hours.

At step 814, neuron activity history associated with the interval may be accessed. In one or more implementations, the activity history may be stored by individual neurons and/or connections (e.g., memory block 1134 of FIG. 11C)). In one or more implementations, the activity history may be stored in a memory buffer shared by one or more neurons and/or connections (e.g., the memory 1108 of FIG. 1A). In one or more implementations, the neuron activity may comprise activity of two or more neuron types configured to respond to different input features (e.g., vertical 1 and horizontal features).

At step 816, a similarity measure C1i(Xi,Xj) between the output of the units of the same type (e.g., horizontally selective units) may be determined.

At step 818, a similarity measure C2i(Xi,Yi) between the output of the units of the different types (e.g., horizontally and vertically selective units) may be determined. In some implementations, the similarity measures C1i, C2i may be based on correlogram, and/or cross correlation between the unit outputs (Xi, Xi) and/or (Xi, Yi). In one or more implementations, the similarity measure may be based on mutual information determined as follows:

$$I(X;Y) = \sum_{y \in Y}\sum_{x \in X} p(x,y) \log\left(\frac{p(x,y)}{p(x)p(y)}\right),.$$ (Eqn. 2)

where:
p(x,y) is the joint probability distribution function of X and Y; and
p(x) and p(y) are the marginal probability distribution functions of X and Y respectively.

In some implementations, the similarity measures C1i, and/or C2i may be determined for one or more respective unit pairs (Xi, Xi,) (Xi, Yi). An averaged similarity measure may be determined as a weighted average:

$$\langle C \rangle = \sum_{i=1}^{N}(a_i C_i) + a_0 \langle C1 \rangle = \sum_{i=1}^{N}(a_i C1_i)\langle C \rangle = \sum_{i=1}^{N}(a_i C_i)$$ (Eqn. 3)

where $a_i$ comprise the weights, and $a_0$ is a biasing term.

At step 820, plasticity rule may be configured based on a difference of the two similarity measures C1, C1. In some implementations, the plasticity rule determination may comprise approach described with respect to FIG. 5, supra.

In some implementations, the method 800 may be performed once, after the different neurons developed (emerged) preferential responses to particular features, as illustrated by the networks 420, 422, 430 in FIG. 4B.

The method 800 may also be implemented iteratively.

In one or more implementations comprising cyclic updates of the network, the method 800 may be configured to be evaluated at every step (e.g., update) of the network operation. That is, the similarity measures and the plasticity rule may be continuously determined and/or refined.

FIG. 9 illustrates a method of updating activity-based plasticity rule (obtained for example using the method 810 of FIG. 8, in accordance with one implementation.

At step 932 of the method 930, connection update may be performed. In some implementations, the update may be based on the adaptively derived activity based plasticity rule (e.g., the rule 506 of FIG. 5).

At step 934, a check may be performed whether the plasticity rule (e.g., used in the update of the step 932) is to be updated.

If the rule to be updated, the method may proceed to step 936, where recent activity of the units may be accessed. In some implementations, the recent activity may comprise activity within a pre-determined interval (e.g., the interval 546 of FIG. 4B). In one or more implementations, the recent activity may comprise activity since most recent rule determination and/or update.

At step 938, a plasticity rule may be determined based on the recent activity. In some implementations, the plasticity rule r may be determined in accordance with the methodology of the method 810 described above with respect to FIG. 8. In one or more implementations, the plasticity rule r may be determined using a difference of similarity measures between: (i) units of the same specificity; and (ii) units of different specificities.

At step 940, the updated plasticity rule R' used for connection updates (e.g., the updates of step 932 of method 930) may be obtained as:

$$R' = aR + br$$ (Eqn. 4)

where:
R is the previous rule; and
r is the rule based on the recent activity; and
a,b are combination weights.

In some implementations, the updated rule R' may be based on the most recent data (a=0 in Eqn. 4). In some implementations, the updated rule R' may comprise an exponential filter (b=1−a in Eqn. 4).

Exemplary Apparatus

Figure 10:
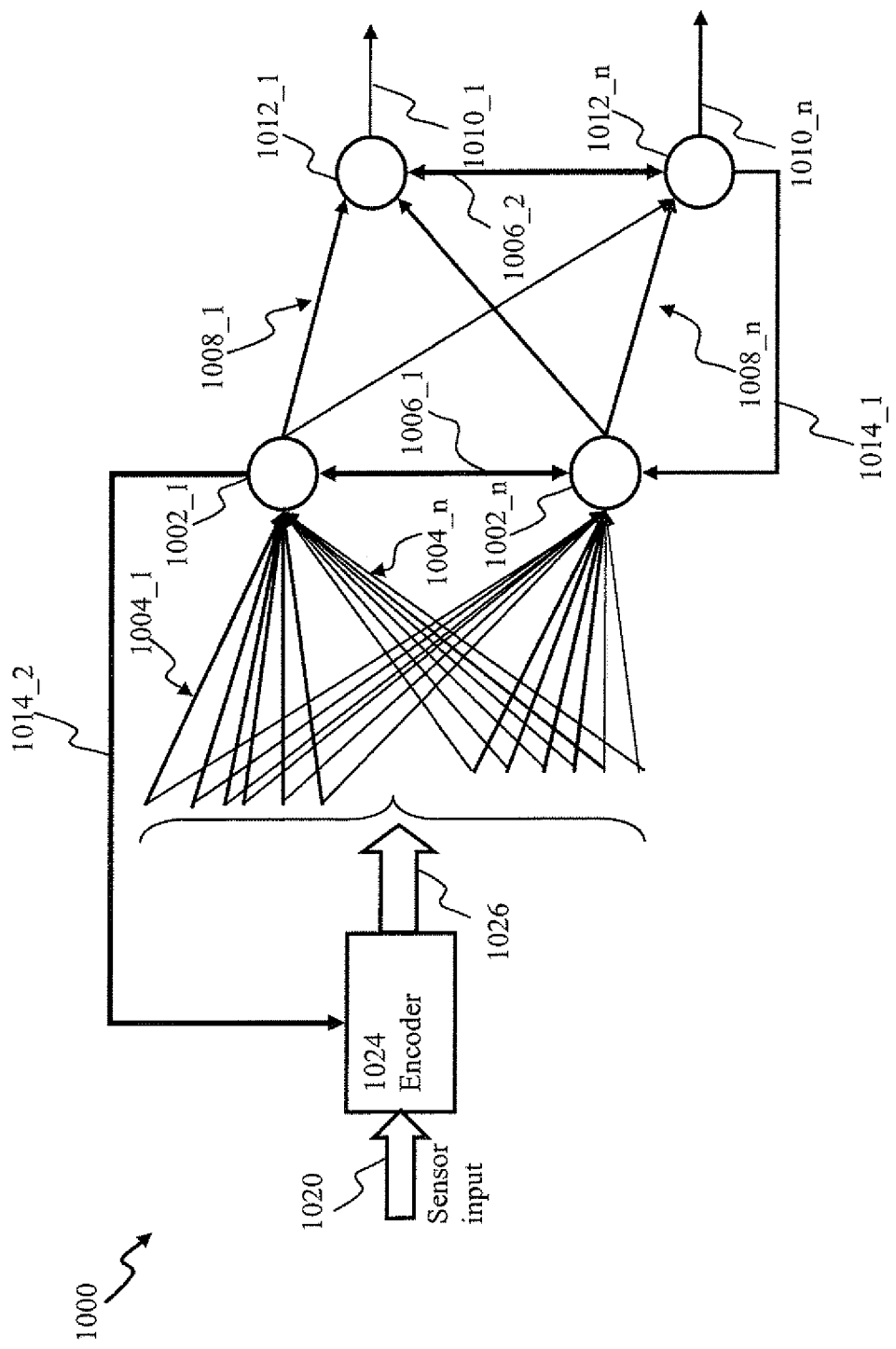
FIG. 10 is a block diagram illustrating a sensory processing apparatus comprising an adaptive plasticity mechanism in accordance with one implementation.

One exemplary spiking neuron network apparatus for processing of sensory information (e.g., visual, audio, somatosensory) useful in an autonomous robotic device, is shown in FIG. 10. The illustrated processing apparatus 1000 may comprise an input interface configured to receive an input sensory signal 1020. In some implementations, this sensory input comprises electromagnetic waves (e.g., visible light, IR, UV, and/or other electromagnetic wages) entering an imaging sensor array (comprising RGCs, a charge coupled device (CCD) or CMOS device, or an active-pixel sensor (APS)). The input signal in this case is a sequence of images (image frames) received from a CCD camera via a receiver apparatus, or downloaded from a file. The image may be a two-dimensional matrix of RGB values refreshed at a 24 Hz frame rate. It will be appreciated by those skilled in the art that the above image parameters are merely exemplary, and many other image representations (e.g., bitmap, CMYK, grayscale, and/or other image representations) and/or frame rates are equally useful with the present invention.

The apparatus 1000 may comprise an encoder 1024 configured to transform (encodes) the input signal into an encoded signal 1026. In some implementations, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer may be denoted by an "_n" designator, such that e.g., the designator 1002_1 denotes the first detector of the layer 1002. Although only two detectors (1002_1, 1002_n) are shown in the implementation of FIG. 10 for clarity, it is appreciated that the encoder can be coupled to any number of detector nodes that is compatible with the detection apparatus hardware and software limitations. A single detector node may be coupled to any practical number of encoders.

In some implementations, individual ones of the detectors 1002_1, 1002_n may contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In some implementations, the detection signals are delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, individual subsequent layers of detectors may be configured to receive signals from the previous detector layer, and/or to detect more complex features and objects (as compared to the features detected by the preceding detector layer). For example, a bank of edge detectors may be followed by a bank of bar detectors, followed by a bank of corner detectors to enable alphabet recognition.

Individual ones of the detectors 1002 may output detection (e.g., post-synaptic) signals on communication channels 1008_1, 1008_n (with appropriate latency) that may propagate with different conduction delays to the detectors 1012. The detector cascade of the implementation of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may comprise lateral connections 1006. In some implementations, the connections 1006 may comprise inhibitory connections configured in accordance with the activity-based plasticity rule described with respect to FIGS. 4A-9.

In some implementations, the apparatus 1000 may comprise feedback connections 1014, configured to communicate context information from detectors within one hierarchy layer to previous layers, as illustrated by the feedback connections 1014_1 in FIG. 10. In some implementations, the feedback connection 1014_2 may be configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 11A:
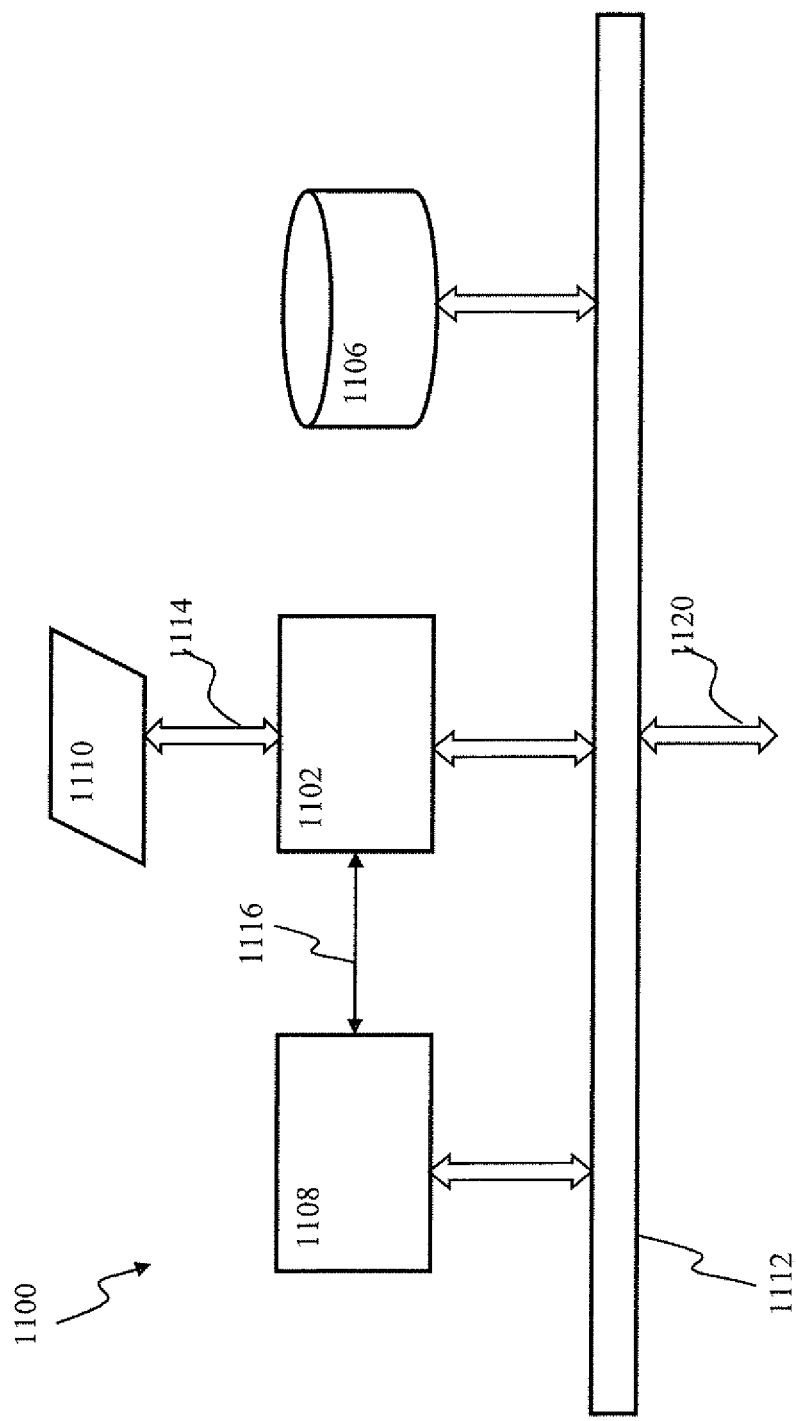
FIG. 11A is a block diagram illustrating a computerized system useful for, inter alia, providing an adaptive plasticity mechanism in a spiking network, in accordance with one implementation.

Some implementations of the computerized neuromorphic processing system, for operating a computerized spiking network (and implementing salient feature detection using the activity based plasticity methodology described supra), are illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, RFID/NFC, and/or other wireless interface) that enables data transfer to the processor 1102 from remote I/O interface 1100. One such implementation may comprise a central processing apparatus coupled to one or more remote camera devices comprising activity based plasticity and/or salient feature detection methodology of the disclosure.

The system 1100 further may comprise a random access memory (RAM) 1108 configured to store neuronal states and connection parameters and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 1108 may be coupled to the processor 1102 via a direct connection (memory bus) 1116, and/or via a high-speed processor bus 1112). In some implementations, the memory 1108 may be embodied within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, and/or other aspects). In one or more implementations, the nonvolatile storage 1106 may be used to store state information of the neurons and connections when, for example, saving/loading network state snapshot, or implementing context switching (e.g., saving current network configuration, which may comprise, inter alia, connection weights and update rules, neuronal states and learning rules, and/or other components) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) and/or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the invention including, for example, an LCD/LED monitor, touch-screen input and display device, speech input device, stylus, light pen, trackball, end the likes.

Figure 11B:
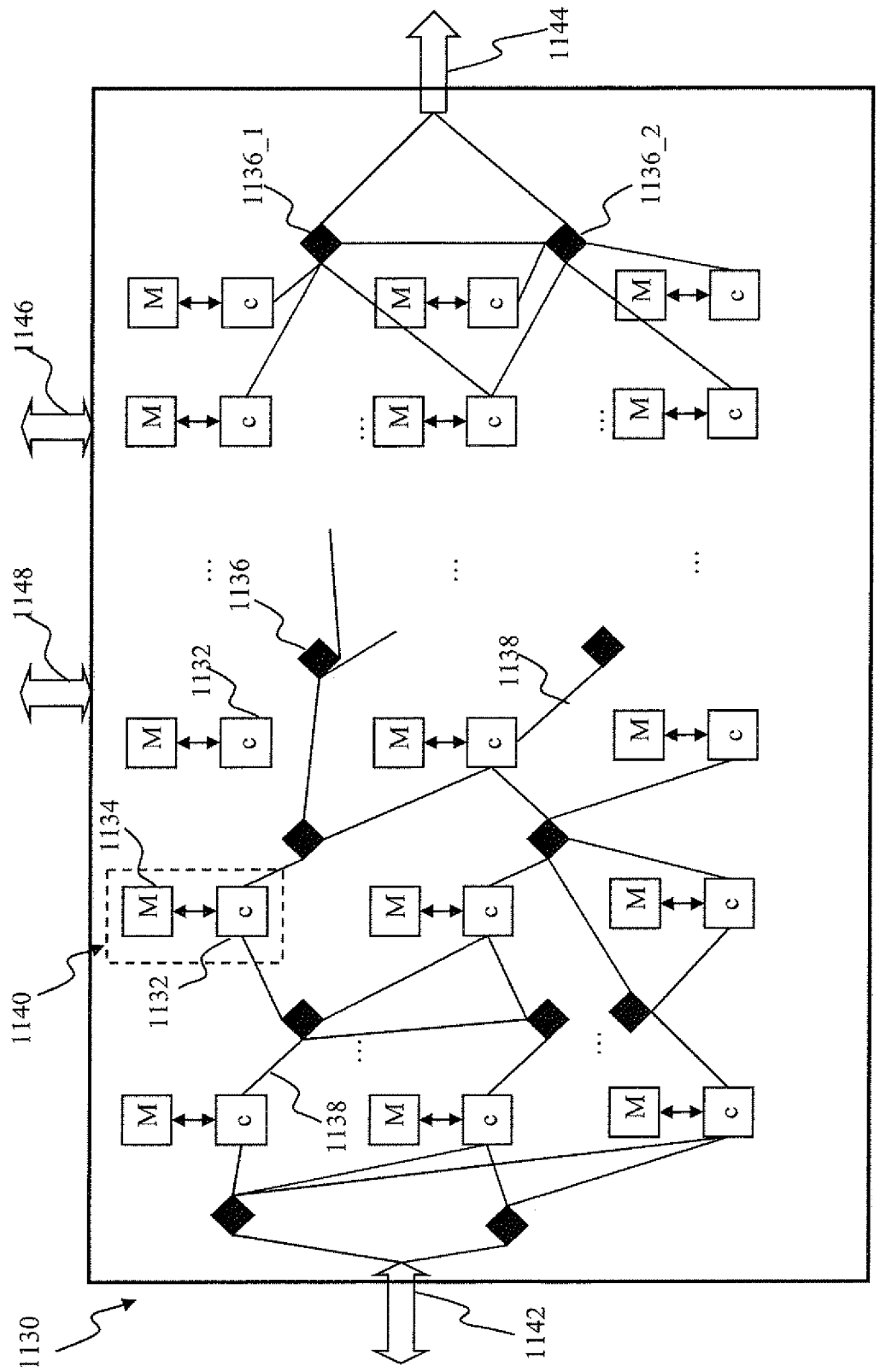
FIG. 11B is a block diagram illustrating a neuromorphic computerized system useful with, inter alia, adaptive plasticity mechanism in a spiking network, in accordance with one implementation.

FIG. 11B, illustrates some implementations of neuromorphic computerized system configured for use with activity based plasticity and/or salient feature detection apparatus described supra. The neuromorphic processing system 1130 of FIG. 11B may comprise a plurality of processing blocks (micro-blocks) 1140, where each micro core may comprise logic block 1132 and memory block 1134, denoted by 'L' and 'M' rectangles, respectively, in FIG. 11B. The logic block 1132 may be configured to implement various aspects of activity based plasticity and/or salient feature detection, such as the latency encoding described in U.S. patent application Ser. No. 12/869,573, entitled "SYSTEMS AND METHODS FOR INVARIANT PULSE LATENCY CODING", filed Aug. 26, 2010, incorporated herein by reference in its entirety, neuron unit dynamic model, detector nodes 1022 if FIG. 10A, and/or inhibitory nodes 1029 of FIG. 10A. The logic block may implement connection updates (e.g., the connections 1014, 1026 in FIG. 10A) and/or other tasks relevant to network operation. In some implementations, the update rules may comprise rules spike time dependent plasticity (STDP) updates. The memory block 1024 may be configured to store, inter alia, neuronal state variables and connection parameters (e.g., weights, delays, I/O mapping) of connections 1138.

One or more micro-blocks 1140 may be interconnected via connections 1138 and routers 1136. In one or more implementations (not shown), the router 1136 may be embodied within the micro-block 1140. As it is appreciated by those skilled in the arts, the connection layout in FIG. 11B is exemplary and many other connection implementations (e.g., one to all, all to all, etc.) are compatible with the disclosure.

The neuromorphic apparatus 1130 may be configured to receive input (e.g., visual input) via the interface 1142. In one or more implementations, applicable for example to interfacing with a pixel array, the apparatus 1130 may be configured to provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
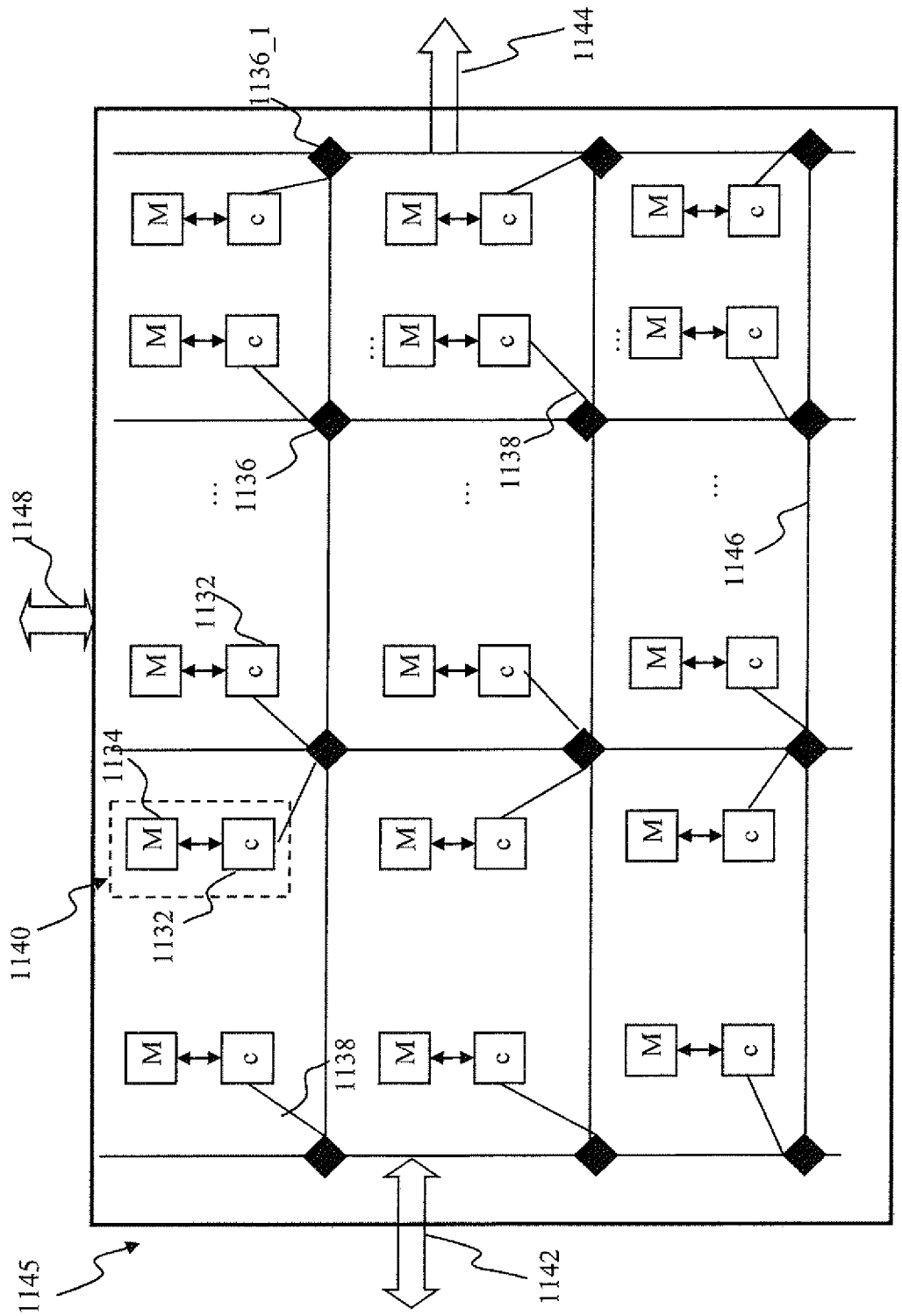
FIG. 11C is a block diagram illustrating a hierarchical neuromorphic computerized system architecture useful with, inter alia, adaptive plasticity mechanism in a spiking network, in accordance with one implementation.
Figure 11D:
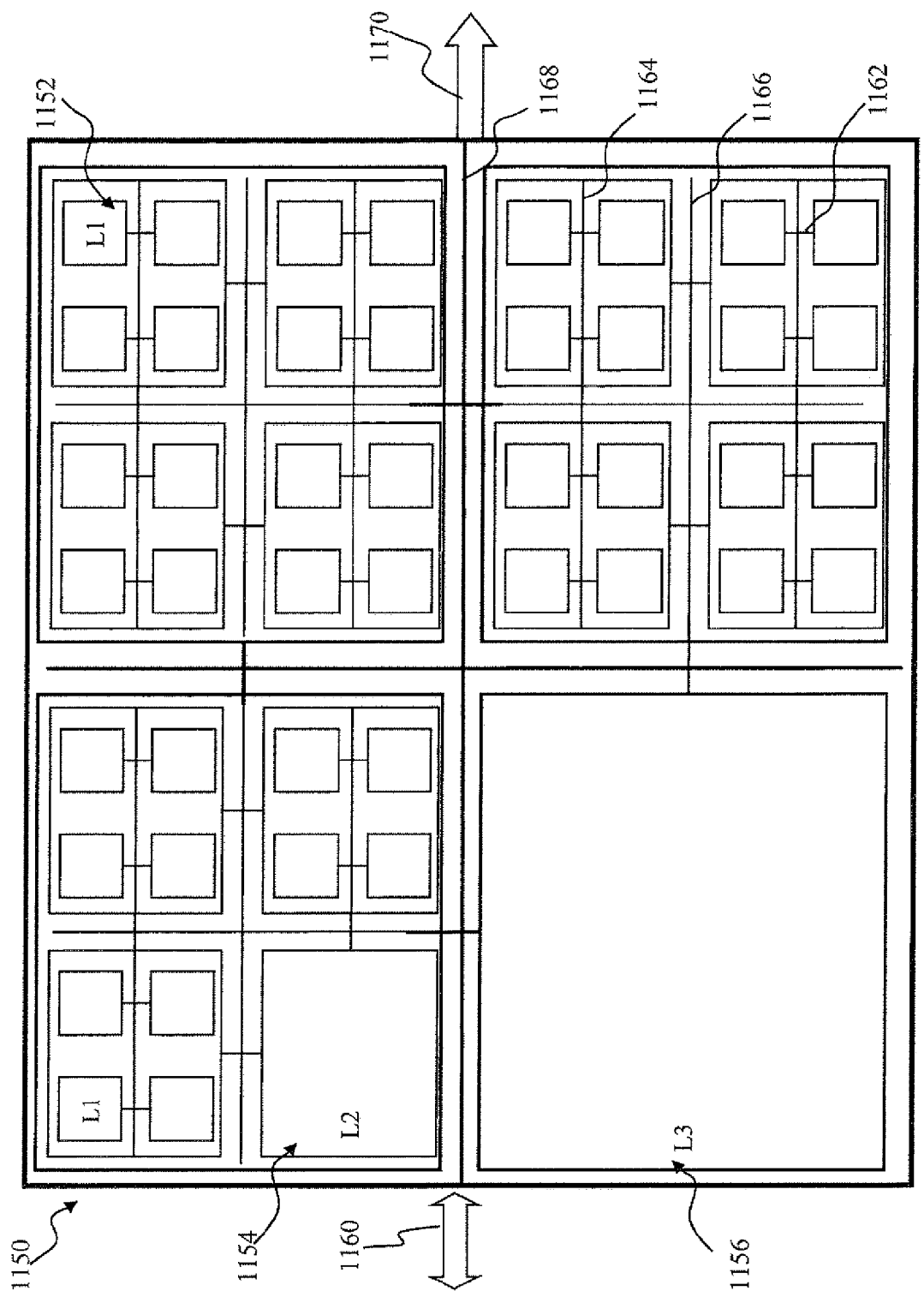
FIG. 11D is a block diagram illustrating a cell-type neuromorphic computerized system architecture useful with, inter alia, adaptive plasticity mechanism in a spiking network, in accordance with one implementation.

FIG. 11C illustrates some implementations of cell-based hierarchical neuromorphic system architecture configured to implement activity based plasticity feature detection. The neuromorphic system 1150 of FIG. 11C may comprise a hierarchy of processing blocks (cells block) 1140. In some implementations, the lowest level L1 cell 1152 of the apparatus 1150 may comprise logic and memory, and may be configured similar to the micro block 1140 of the apparatus shown in FIG. 11B, supra. A number of cell blocks 1052 may be arranges in a cluster 1154 and communicate with one another via local interconnects 1162, 1164. Individual ones of such clusters may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level, shown in FIG. 11C represents one exemplary implementation and other implementations may comprise more or fewer cells/level and/or fewer or more levels.

Different cell levels (e.g., L1, L2, L3) of the apparatus 1150 may be configured to perform functionality various levels of complexity. In some implementations, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. In one or more implementations, applicable for example to interfacing with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, etc.). The apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576, entitled "DYNAMICALLY RECONFIGURABLE STOCHASTIC LEARNING APPARATUS AND METHODS", incorporated supra.

Exemplary Uses and Applications of Certain Aspects of the Disclosure

The activity based adaptive plasticity rule may advantageously aid unit selectivity during network operation during and/or subsequent to training. The efficacy of inhibitory connections between units responding to similar features may be increased and the efficacy of inhibitory connections between units responding to different features may be reduced. Inhibitory connection between units of the same selectivity (for example, red-red, green-green) may become stronger, while inhibitory connections between red-green units may become weaker. Strong inhibitory connections may cause red (green) units to sufficiently inhibit activity (spike output generation) of other red (green) units. At the same time, red/green units may not inhibit sufficiently the activity of green/red units, respectively. When the input comprises a large portion of features of one type (red features), the response of the red units may grow progressively weaker and/or less consistent, compared to the response of the green units. As a result, the saliency map may comprise greater emphasis at the green feature location.

The activity based saliency map may be provided to an image acquisition block. A saccade may be generated to the salient (for example, green) feature location. A saccade may be generated to an object/feature in the scene that is the most outstanding/oddball That is, to an object that is the least-like the others—for example: a woman in a group of men; an oddly dressed person in a group; a red flower in a group of yellow flowers; and or other.

An image acquisition block may be configured to process temporal sequences. The activity based saliency map may be used to identify "oddball" motions—for example, a person that moves against the crowd; a person that moves differently than the rest of the group; etc.

The activity based saliency map may be provided to other signal acquisition blocks, such as acoustic acquisition block. The orientation of the system may be directed to the most outstanding/distinct features—for example: female voice in a men's choir; a foreign language speaker in a group of native speakers.

It is appreciated by those skilled in the arts that above implementation are exemplary, and the framework of the disclosure is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure. The scope of the disclosure should be determined with reference to the claims.

What is claimed:

1. A method of updating an efficacy of inhibitory connections of a spiking neuron network, the method comprising, for an input signal:

based on a first rule, potentiating a first plurality of inhibitory connections associated with a first portion the network, individual ones of the first plurality of inhibitory connections and a second plurality of inhibitory connections configured to provide inhibitory signals to neurons of the first and the second portions, respectively; and based on a second rule, potentiating the second plurality of inhibitory connections;

wherein:

the neurons of the first portion are configured to respond to a first feature;

the neurons of the second portion are configured to respond to a second feature;

the first rule is configured to cause a first inhibitory signal;

the second rule is configured to cause a second inhibitory signal that is smaller than the first inhibitory signal; and the first rule and the second rule cooperate to suppress the neurons of the first portion from response to the first feature.

2. A computerized spiking neuron network visual input processing system, comprising:
a sensing apparatus configured to acquire a frame of the visual input, the frame associated with a first location; and
logic configured to generate a saliency map based on identification of a salient feature in the frame, the salient feature characterized by a second location;
wherein:
the frame comprises a representation of the salient feature and one or more other features;
a first portion of neurons of a network is configured to respond to the salient feature, and a second portion of neurons of the network is configured to respond to at least one of the one or more other features;
the identification of the salient feature is based on a lateral inhibition mechanism comprising:
in accordance with a first rule, potentiate a first plurality of inhibitory connections between the first portion of neurons and the second portion of neurons; and
in accordance with a second rule, potentiate a second plurality of inhibitory connections between individual ones of the second portion of neurons;
the second rule is characterized by an inhibitory efficacy configured to suppress response generation by at least some of the second portion of neurons; and
the second rule is configured to cause a second inhibitory signal that is smaller than a first inhibitory signal, where the first rule and the second rule cooperate to suppress the first portion of neurons from response to the salient feature.

3. The system of claim 2, further comprising logic configured to position the sensing apparatus in accordance with the saliency map at the second location.

4. The system of claim 2, wherein the salient feature comprises at least one feature characteristic that is different from a feature characteristic associated with the at least one of the one or more other features.

5. The system of claim 4, wherein the feature characteristic is selected from the group consisting of: feature shape, orientation, chromaticity, luminance, transparency, and texture.

6. Computerized spiking neuron network processing apparatus comprising a storage medium, the storage medium comprising a plurality of computer executable instructions configured to, when executed by a processor, cause the processor to process sensory input representative of at least first and second features, by at least:
based on an input, cause neurons of a first portion of a neuron network to respond to a first feature and neurons of a second portion of the network to respond to a second feature;
based on a first rule, potentiate a first plurality of inhibitory connections associated with the first portion of the network, individual ones of the first plurality of inhibitory connections configured to provide inhibitory signals between individual neurons within the first portion; and
based on a second rule, adjust a second plurality of inhibitory connections, individual ones of the second plurality of inhibitory connections configured to provide inhibitory signals between the neurons of the first portion and the neurons of the second portion;
wherein:
the first rule is characterized by a first inhibitory efficacy configured to suppress a response of the neurons of the first portion to the first feature;
the second rule is characterized by a second inhibitory efficacy, the second efficacy being lower than the first inhibitory efficacy; and
the first rule and the second rule cooperate to enable the neurons of the second portion to respond to the second feature.

7. The apparatus of claim 6, wherein the adjustment comprises at least potentiation of the second plurality of inhibitory connections by an amount that is lower than an amount associated with the potentiation of the first plurality of inhibitory connections.

8. The apparatus of claim 6, wherein:
the first inhibitory efficacy and the second inhibitory efficacy each comprise a connection weight.

9. The apparatus of claim 8, wherein:
the connection weight of the first inhibitory efficacy is configured between 0 and 1 inclusive;
the connection weight of the second inhibitory efficacy is configured between 0 and 1 inclusive; and
a connection weight equal to a value of 1 corresponds to strong inhibition configured to prevent an occurrence of the response by the neurons, and a connection weight equal to the value of 0 corresponds to an absence of inhibition.

10. The apparatus of claim 9, wherein configuration of the connection weight equal to the value of 0.5, corresponds to weak inhibition configured to reduce a probability of occurrence of the response by the neurons.

11. The apparatus of claim 6, wherein the enablement of the neurons of the second portion to respond to the second feature is characterized by a response probability that is greater than zero.

12. The apparatus of claim 11, wherein the response probability is in a range between 0.9 and 1 inclusive.

13. The apparatus of claim 6, wherein the suppression of the response is configured to reduce a probability of the response by the neurons of the first portion to the first feature, relative to a response probability in an absence of the potentiation.

14. The apparatus of claim 13, wherein:
the input comprises a stream of visual frames characterized by an inter-frame interval; and
the reduced probability is characterized by an absence of the response by the neurons within the inter-frame interval subsequent to provision of the input.

15. The apparatus of claim 6, wherein:
the response of the neurons of the first portion to the first feature is characterized by a response latency; and
the suppression is configured to increase the latency relative to a response latency in an absence of the potentiation.

16. The apparatus of claim 6, wherein:
the response of the neurons of the first portion to the first feature is characterized by a number of output spikes; and
the suppression is configured to decrease the number of output spikes relative to number of output spikes in absence of the potentiation.

17. The apparatus of claim 6, wherein the second feature comprises a salient feature within the input.

18. The apparatus of claim 17, wherein the first feature occurs more frequently within the input than the salient feature.

19. The apparatus of claim 17, wherein the first inhibitory efficacy is based at least on a frequency of occurrence of the first feature relative to the salient feature.

20. The apparatus of claim 6, wherein the first inhibitory efficacy is characterized by a gating mechanism configured to prevent the response of the neurons when the inhibitory efficacy is non-zero.

21. The apparatus of claim 6, wherein at least a portion of the inhibitory connections comprises lateral connections.

22. Computerized spiking neuron network processing apparatus comprising a storage medium, the storage medium comprising a plurality of computer executable instructions configured to, when executed by a processor, cause the processor to process sensory input representative of at least first and second features, by at least:
   based on an input, cause neurons of a first portion of a neuron network to respond to a first feature and neurons of a second portion of the network to respond to a second feature; and
   based on a first rule, potentiate a first plurality of inhibitory connections associated with the first portion of the network, individual ones of the first plurality of inhibitory connections configured to provide inhibitory signals between individual neurons within the first portion;
   wherein the first rule is characterized by a first inhibitory efficacy configured to suppress a response of the neurons of the first portion to the first feature; and
   wherein the suppression of the response is characterized by probability between 0 and 0.1, inclusive.

23. Computerized spiking neuron network processing apparatus comprising a storage medium, the storage medium comprising a plurality of computer executable instructions configured to, when executed by a processor, cause the processor to process sensory input representative of at least first and second features, by at least:
   based on an input, cause neurons of a first portion of a neuron network to respond to a first feature and neurons of a second portion of the network to respond to a second feature; and
   based on a first rule, potentiate a first plurality of inhibitory connections associated with the first portion of the network, individual ones of the first plurality of inhibitory connections configured to provide inhibitory signals between individual neurons within the first portion;
   wherein:
      the first rule is characterized by a first inhibitory efficacy configured to suppress a response of the neurons of the first portion to the first feature;
      the second feature comprises a salient feature within the input; and
      the first inhibitory efficacy is based at least on a frequency of occurrence of the first feature relative to the salient feature.

* * * * *